US011398254B2

(12) United States Patent
Newell et al.

(10) Patent No.: US 11,398,254 B2
(45) Date of Patent: *Jul. 26, 2022

(54) METHODS AND SYSTEMS FOR AN AUGMENTED FILM CREW USING STORYBOARDS

(71) Applicant: DISH Network L.L.C., Englewood, CO (US)

(72) Inventors: Nicholas B. Newell, Centennial, CO (US); Abhijit Sharma, Denver, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/993,542

(22) Filed: Aug. 14, 2020

(65) Prior Publication Data
US 2020/0372936 A1 Nov. 26, 2020

Related U.S. Application Data

(63) Continuation of application No. 15/858,693, filed on Dec. 29, 2017, now Pat. No. 10,783,925.

(51) Int. Cl.
*G11B 27/031* (2006.01)
*G11B 27/10* (2006.01)
(Continued)

(52) U.S. Cl.
CPC ............ *G11B 27/031* (2013.01); *G11B 27/10* (2013.01); *H04N 21/435* (2013.01);
(Continued)

(58) Field of Classification Search
CPC .................. G11B 27/031; G11B 27/10; H04N 21/47205; H04N 21/44016; H04N 21/435;
(Continued)

(56) References Cited

U.S. PATENT DOCUMENTS 8,285,000 B2 10/2012 Jiang
8,666,223 B2 3/2014 Momosaki
(Continued)

OTHER PUBLICATIONS

U.S. Appl. No. 15/858,675, Advisory Action, dated Mar. 9, 2020, 11 pages.
(Continued)

*Primary Examiner* — Loi H Tran
(74) *Attorney, Agent, or Firm* — Kilpatrick Townsend & Stockton LLP

(57) ABSTRACT

Systems and processes associated with an augmented film crew. For example, a computer-implemented method may include receiving, at a display of a user media device, an indication that a user of the media device intends to generate a user video in an environment; generating, by the user media device, data associated with the environment using a sensor of the user media device; determining, by the user media device, a purpose for the user video using the data associated with the environment; presenting, at the display, a set of screenplays for the user video, wherein the set of screenplays is determined based on the duration, the purpose, and the data associated with the environment; receiving, at the display, an input from the user indicating a selected screenplay from the set of screenplays, wherein the selected screenplay is associated with a set of storyboards; displaying, at the user media device, a first storyboard of the set of storyboards, wherein the first storyboard is overlaid onto a user video stream generated by the user media device; receiving, at the user media device, an additional video stream generated by an additional network device; and generating, by the user media device, the user video using the user video stream or the additional video stream. The above steps may be implemented as instructions stored in a computer-readable medium, computer program product, or
(Continued)

device such as a television receiver, or in other types of embodiments.

20 Claims, 16 Drawing Sheets

(51) Int. Cl.
| | |
|---|---|
| H04N 21/44 | (2011.01) |
| H04N 21/435 | (2011.01) |
| H04N 21/81 | (2011.01) |
| H04N 21/854 | (2011.01) |
| H04N 21/45 | (2011.01) |
| H04N 21/472 | (2011.01) |
| H04N 21/431 | (2011.01) |

(52) U.S. Cl.
CPC . *H04N 21/44008* (2013.01); *H04N 21/44016* (2013.01); *H04N 21/4532* (2013.01); *H04N 21/47205* (2013.01); *H04N 21/8133* (2013.01); *H04N 21/854* (2013.01); *H04N 21/4316* (2013.01); *H04N 21/47202* (2013.01)

(58) Field of Classification Search
CPC ............ H04N 21/8133; H04N 21/854; H04N 21/44008; H04N 21/4532; H04N 21/47202; H04N 21/4316
USPC ........................................................ 386/241
See application file for complete search history.

(56) References Cited

U.S. PATENT DOCUMENTS

| | | | |
|---|---|---|---|
| 8,988,611 B1 | 3/2015 | Terry | |
| 9,106,812 B1 | 8/2015 | Price et al. | |
| 9,143,677 B1 | 9/2015 | Anon | |
| 9,451,178 B2 | 9/2016 | Kelder et al. | |
| 9,456,174 B2 | 9/2016 | Boyle et al. | |
| 9,473,819 B1 | 10/2016 | Bostick et al. | |
| 10,078,644 B1 | 9/2018 | Newman et al. | |
| 10,181,197 B2 | 1/2019 | Hirasawa et al. | |
| 10,229,327 B2 | 3/2019 | Koyama | |
| 10,453,496 B2 | 10/2019 | Newell et al. | |
| 2003/0001846 A1 | 1/2003 | Davis et al. | |
| 2003/0210329 A1* | 11/2003 | Aagaard ................ H04N 5/247 348/159 |
| 2003/0210808 A1 | 11/2003 | Chen et al. | |
| 2004/0071441 A1 | 4/2004 | Foreman et al. | |
| 2004/0128682 A1 | 7/2004 | Liga et al. | |
| 2008/0010601 A1 | 1/2008 | Dachs | |
| 2008/0037826 A1 | 2/2008 | Sundstrom et al. | |
| 2009/0169168 A1 | 7/2009 | Ishikawa | |
| 2009/0251460 A1* | 10/2009 | Dunnigan ................ G06T 15/50 345/419 |
| 2010/0183280 A1 | 7/2010 | Beauregard et al. | |
| 2010/0278509 A1 | 11/2010 | Nagano et al. | |
| 2010/0299630 A1 | 11/2010 | McCutchen et al. | |
| 2011/0194839 A1 | 8/2011 | Gebert et al. | |
| 2011/0217019 A1 | 9/2011 | Kamezawa et al. | |
| 2012/0158935 A1 | 6/2012 | Kishimoto et al. | |
| 2012/0213497 A1 | 8/2012 | Lou et al. | |
| 2012/0263433 A1 | 10/2012 | Mei et al. | |
| 2012/0311448 A1 | 12/2012 | Achour et al. | |
| 2012/0324491 A1 | 12/2012 | Bathiche et al. | |
| 2013/0163963 A1 | 6/2013 | Crosland et al. | |
| 2013/0272673 A1 | 10/2013 | Swearingen et al. | |
| 2014/0086562 A1 | 3/2014 | Lassman et al. | |
| 2014/0169766 A1 | 6/2014 | Yu et al. | |
| 2014/0226953 A1 | 8/2014 | Hou | |
| 2014/0355962 A1 | 12/2014 | Kim et al. | |
| 2015/0015680 A1 | 1/2015 | Wang et al. | |
| 2015/0141140 A1 | 5/2015 | Lampe et al. | |
| 2015/0154452 A1 | 6/2015 | Bentley et al. | |
| 2015/0302067 A1 | 10/2015 | Eluard et al. | |
| 2015/0318020 A1 | 11/2015 | Pribula | |
| 2015/0324636 A1 | 11/2015 | Bentley et al. | |
| 2015/0332622 A1* | 11/2015 | Liu ...................... G09G 3/2003 705/14.54 |
| 2015/0356840 A1 | 12/2015 | Wang et al. | |
| 2015/0375117 A1 | 12/2015 | Thompson et al. | |
| 2016/0073010 A1 | 3/2016 | Cronin et al. | |
| 2016/0205358 A1 | 7/2016 | Dickinson | |
| 2016/0225410 A1 | 8/2016 | Lee et al. | |
| 2016/0247026 A1 | 8/2016 | Lin et al. | |
| 2016/0322078 A1 | 11/2016 | Bose et al. | |
| 2016/0366203 A1 | 12/2016 | Blong et al. | |
| 2017/0004358 A1 | 1/2017 | Bose et al. | |
| 2017/0025152 A1 | 1/2017 | Jaime et al. | |
| 2017/0034237 A1 | 2/2017 | Silver | |
| 2017/0062009 A1* | 3/2017 | Clifton ............... G06K 9/00765 |
| 2017/0083520 A1 | 3/2017 | Huang et al. | |
| 2017/0085786 A1 | 3/2017 | Ishida et al. | |
| 2017/0110151 A1 | 4/2017 | Matias et al. | |
| 2017/0134320 A1 | 5/2017 | Sellers et al. | |
| 2017/0157512 A1 | 6/2017 | Long et al. | |
| 2017/0192733 A1 | 7/2017 | Huang et al. | |
| 2017/0208362 A1 | 7/2017 | Flores et al. | |
| 2017/0359552 A1 | 12/2017 | Kobayashi | |
| 2018/0035136 A1* | 2/2018 | Crowe ............... H04N 21/4316 |
| 2018/0144775 A1 | 5/2018 | Taine et al. | |
| 2019/0130620 A1 | 5/2019 | Christiansen et al. | |
| 2019/0149833 A1 | 5/2019 | Benedetto | |
| 2019/0206439 A1 | 7/2019 | Newell et al. | |
| 2019/0208287 A1 | 7/2019 | Newell et al. | |
| 2019/0215660 A1* | 7/2019 | Slushtz .................. G01S 19/19 |
| 2019/0253672 A1 | 8/2019 | Pflug et al. | |
| 2020/0005689 A1* | 1/2020 | Wu ........................ G09G 3/003 |

OTHER PUBLICATIONS

U.S. Appl. No. 15/858,675 , Advisory Action, dated Sep. 6, 2019, 2 pages.
U.S. Appl. No. 15/858,675 , Final Office Action, dated Jun. 21, 2019, 13 pages.
U.S. Appl. No. 15/858,675 , Final Office Action, dated Jan. 9, 2020, 14 pages.
U.S. Appl. No. 15/858,675 , Non-Final Office Action, dated Dec. 28, 2018, 13 pages.
U.S. Appl. No. 15/858,675 , Non-Final Office Action, dated Oct. 2, 2019, 15 pages.
U.S. Appl. No. 15/858,675 , Notice of Allowance, dated Jul. 1, 2020, 10 pages.
U.S. Appl. No. 15/858,693 , Advisory Action, dated Aug. 9, 2019, 2 pages.
U.S. Appl. No. 15/858,693 , Final Office Action, dated Jun. 12, 2019, 16 pages.
U.S. Appl. No. 15/858,693 , Final Office Action, dated Mar. 13, 2020, 17 pages.
U.S. Appl. No. 15/858,693 , Non-Final Office Action, dated Dec. 27, 2018, 13 pages.
U.S. Appl. No. 15/858,693 , Non-Final Office Action, dated Sep. 17, 2019, 14 pages.
U.S. Appl. No. 15/858,693 , Notice of Allowance, dated May 20, 2020, 9 pages.
U.S. Appl. No. 15/858,721 , Non-Final Office Action, dated Dec. 27, 2018, 13 pages.
U.S. Appl. No. 15/858,721 , Notice of Allowance, dated Jun. 13, 2019, 9 pages.

\* cited by examiner

METHODS AND SYSTEMS FOR AN AUGMENTED FILM CREW USING STORYBOARDS

CROSS-REFERENCES TO RELATED APPLICATIONS

This application is a continuation of U.S. patent application Ser. No. 15/858,693, filed on Dec. 29, 2017, entitled "Methods and Systems for an Augmented Film Crew Using Storyboards," the disclosure of which is hereby incorporated by reference in its entirety for all purposes.

TECHNICAL FILED

The present disclosure relates to capturing live action video data using an augmented film crew. More specifically, the present technology is directed to a system that assists a user in creating high quality video using data collected and analyzed from an environment.

BACKGROUND

The use of media data such as video data has increased rapidly. Media data is used for various purposes, including to create movies, record and view sports events, for home security, to capture personal and family events, to sell real estate, for streaming, among others. Video becomes even more flexible and useful when data associated with the environment in which the video is shot is captured, analyzed, and used to assist a user in generating the video.

SUMMARY

Embodiments of the present technology include systems and processes associated with an augmented film crew. For example, a computer-implemented method may include receiving, at a display of a user media device, an indication that a user of the user media device intends to generate a user video in an environment; receiving, at the display, an input indicating a user preference associated with the user video; generating, by the user media device, data associated with the environment using a sensor of the user media device; determining, by the user media device, a purpose for the user video using the user preference and the data associated with the environment, wherein the purpose is chosen from a predetermined set of purposes; detecting an additional media device that is located in the environment, wherein the additional media device is associated with the user or the user media device; determining pre-production assignments for the user video using the purpose and the additional media device, wherein the pre-production assignments indicate one or more characteristics of the scene for the user video in the environment; generating, using the user media device, a first video stream of the scene in the environment using the pre-production assignments; receiving, from the additional media device, a second video stream of the scene; and generating, by the user media device, the user video using the first video stream or the second video streams. The above steps may be implemented as instructions stored in a computer-readable medium, computer program product, or device such as a television receiver, or in other types of embodiments.

In another example embodiment, a computer-implemented method may include receiving, at a display of a user media device, an indication that a user of the media device intends to generate a user video in an environment; generating, by the user media device, data associated with the environment using a sensor of the user media device; determining, by the user media device, a purpose for the user video using the data associated with the environment; presenting, at the display, a set of screenplays for the user video, wherein the set of screenplays is determined based on the duration, the purpose, and the data associated with the environment; receiving, at the display, an input from the user indicating a selected screenplay from the set of screenplays, wherein the selected screenplay is associated with a set of storyboards; displaying, at the user media device, a first storyboard of the set of storyboards, wherein the first storyboard is overlaid onto a user video stream generated by the user media device; receiving, at the user media device, an additional video stream generated by an additional network device; and generating, by the user media device, the user video using the user video stream or the additional video stream. The above steps may be implemented as instructions stored in a computer-readable medium, computer program product, or device such as a television receiver, or in other types of embodiments.

In another example embodiment, a computer-implemented method may include generating, by a user media device, an environment video stream associated with a scene in an environment, wherein the environment video stream is generated using a first sensor of the user media device; receiving, at the user media device, an additional video stream generated by an additional network device; generating the user video using the environment video stream or the additional video stream; generating a user video stream, wherein the user video stream is generated using a second sensor of the user media device; determining a sweet spot of the user video stream, wherein the sweet spot is a portion of the user video stream that indicates an important event in the scene based on a physical appearance, movement, or audible sound of the user; identifying a portion of the user video associated with the sweet spot of the user video stream; and generating an updated user video using the environment video stream or the additional video stream, and the user video stream. The above steps may be implemented as instructions stored in a computer-readable medium, computer program product, or device such as a television receiver, or in other types of embodiments.

Figure 1:
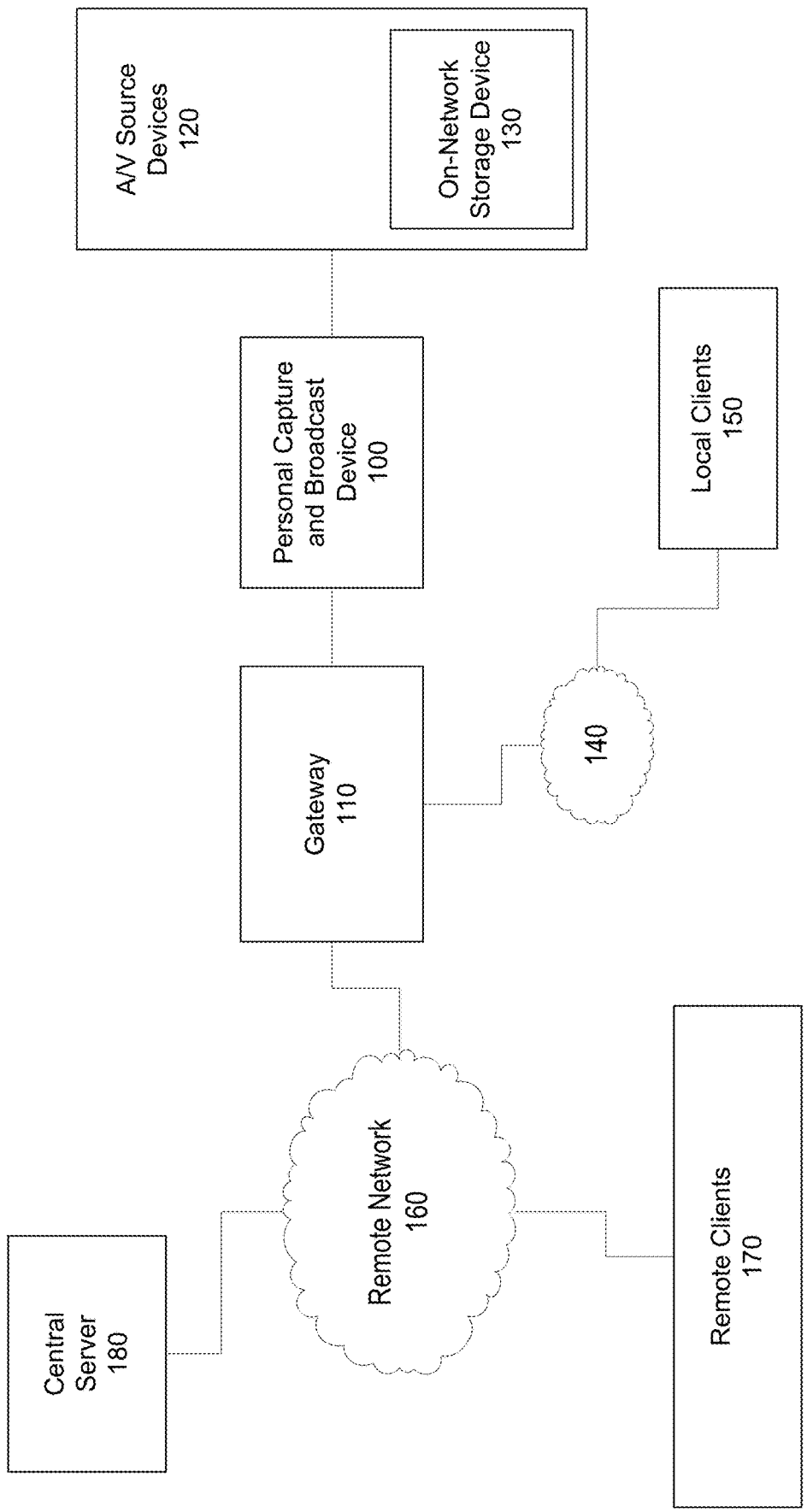
FIG. 1 illustrates a block diagram of the media broadcasting system in accordance with one embodiment of the invention, according to embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present disclosure relates to capturing live action video data. More specifically, the present technology is directed to facilitating the generation of professional videos using an augmented film crew on a media device.

The present disclosure is directed to a media studio and processing system that allows a user to capture video or other types of media data associated with live events from multiple different angles or locations. The media studio allows for the user to preview multiple media input items (e.g., simultaneously on a display), generating a media output item based on the multiple media input items, sharing the media output item, and/or storing the media output item for future viewing. All of these actions may be taken using a remote operator console communicatively connected to the media studio. The media studio may be programmed to generate recommendations for the media output item and/or generate the media output item directly based on predetermined rules.

The media studio may receive data from data collectors (e.g., one or more sensors, such as video capturing devices) mounted on or in a media device (e.g., a camera, smart phone, tablet, other mobile device, etc.). The data may be received directly from the data collectors, or indirectly, for example via metadata associated with the media input items. The selection of media input items for inclusion in the media output item may be based in part on the data from the data collectors or analysis of that data.

In one example, the media studio may be located in an environment in which a user wants to capture video data in order to generate a professional video. Media devices may be placed at different locations or angles and capture data, via their data collectors, associated with the environment. The sporting event may include various other types of data associated with it other than video data of the environment itself, such as data associated with people (i.e., potential actors), temperature, objects (i.e., props), among other data. This data may be used as part of, and to enhance, a final product of professional video, which may be made up of video data collected from the different video capturing devices in the environment. The system may determine important characteristics of a content item and a user's intent for the content item even before the content item is created. For example, the system may help determine a purpose of the content item, characters, screenplay, storyboards, and other information for the content item, etc. The system may also assist the user with pre-production steps and settings, and assist with filming using storyboards and other information. The system may also automatically determine a sweet spot of a content item. Furthermore, the system may also collect data over time about a user, the user's content items, the environments and locations the user uses, the characters and other people associated with the user and the user's content items, feedback about the content items, and a variety of other information that may cause the system to become smarter over time, and to help the user create better content items over time.

FIG. 1 is a block diagram of the media broadcasting system in accordance with one embodiment of the invention, according to embodiments of the present technology. As illustrated, a personal capture and broadcast device 100 is configured to generate video or receive an input video signal from a A/V source device 120. For example, any component or device having digital or analog A/V outputs can be connected to the personal broadcast device 100. For example, the A/V output may be part of a television receiver or other similar device. Personal broadcast device 100 may also receive such input video signal wirelessly. Upon receiving the video and/or audio, the personal broadcaster digitizes, encodes, and streams the digitally compressed media to the gateway 110. The gateway 110 may comprise one or more separate devices, including a router (e.g., wireless), a switch or hub, and/or an analog, cable or other type of broadband modem, or the gateway 110 may comprise a single device that encompasses one or more of these functions.

The gateway 110 may be coupled to a local area network (LAN) 140 that couples several computing devices in a user's home. According to known techniques, any number of local clients 150 may be able to communicate with the gateway 110. In this way, created by the media broadcast device 100 may be routed to any of these local clients 150 by way of the local network 140, either through the gateway or directly. Personal broadcast device 100 may also be connected to the LAN directly or through another mechanism other than gateway 110. The local area network 140 can be wired or wireless, as the present technology is not limited to any particular network technology or configuration. The local clients 140 can be any number of device types, including but not limited to desktop and notebook PCs, mobile devices (e.g., smartphones, tablets, etc.), embedded clients built expressly for the purposes of decoding the streams of the personal broadcaster, and other devices capable of receiving and/or playing a media stream over a network.

The media streams created by the personal broadcast device 100 may also be received by remote clients 170 from a remote network 160. The remote network 160 may comprise any suitable networking technology, including but not limited to wide area mobile networks, WiFi, and other public broadband access locations, other LANs (such as at work, school, or a friend's home), and direct connections to other Internet service providers. As with the local clients 150, the remote clients 170 may include any number of device types, but not limited to desktop and notebook PCs, mobile devices (e.g., smartphones, tablets, etc.), embedded clients built expressly for the purposes of decoding the streams of the personal broadcaster, and other devices capable of receiving and/or playing a media stream over a network. In one embodiment, the local clients 150 and/or the remote clients 170 execute a client software application that includes a user interface for requesting content from the broadcast device 100 and for viewing that content. In another embodiment, the client functionality is provided by a website and is accessible by the local clients 150 and/or the remote clients 170 via a browser.

In another embodiment, personal capture device 100 may not receive an input video signal from another device, such as A/V source device(s) 120, but instead may generate video content on its own. For example, personal capture device 100 may be or include a video camera to capture video. For example, personal capture device 100 may be a smartphone or other mobile device that includes a video camera, a processor, and a storage device to capture, process, and save, respectively, a video. In another example, personal capture device 100 may capture video and immediately, in real time, output the video. For example, personal capture device 100 may transmit, via a WiFi, 4G, or other wireless medium, the video so that the video may be broadcast using a video broadcasting or streaming service. The streaming video may also be video that was captured and saved at a previous time, so not in real time. As noted above, personal capture and broadcast device 100 may be connected to a LAN, which may have other devices connected to it. Using such a structure, multiple personal capture and broadcast devices may capture video and save, transmit, and/or stream video simultaneously, and a device may be used to combine, view, or otherwise manipulate the video feeds at once.

Figure 2:
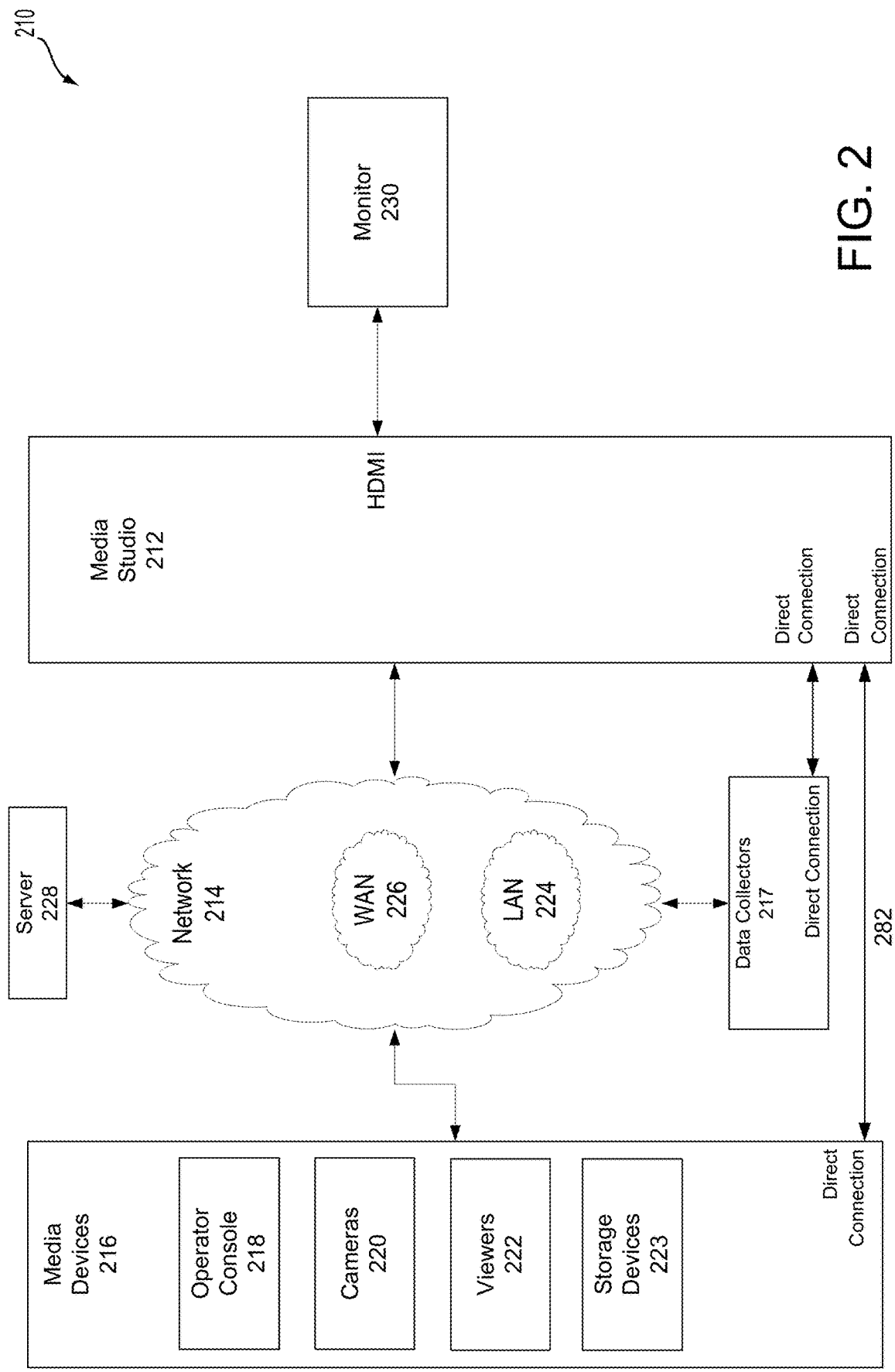
FIG. 2 illustrates a block diagram of an example media processing system for capturing and mixing multiple media streams into an output media stream.

FIG. 2 illustrates a block diagram of an example media processing system for capturing and mixing multiple media streams into an output media stream, according to embodiments of the present technology. As shown in FIG. 2, the media processing system 210 may include a media studio 212, one or more media devices 16 (e.g., mobile device with media capturing sensor), and one or more data collectors 217. The one or more media devices 216 include the operator console 218, and may further include one or more cameras 220, one or more viewers 222, and one or more media storage devices 223. The media devices 216 and the data collectors 217 may be remote or local to the media studio 212 and may be coupled to the media studio 212 via at least one of the network 214 and a direct wired or wireless connection 282.

The media processing system 210 may include a mobile media studio 212, which can receive media input data from one or more media devices 216. The media input data may be received from the one or more media devices 216 via one or more wired and/or wireless networks 214 and one or more wired and/or wireless direct connections. Receiving media data may include receiving media data sent from a media device 216 (e.g., a camera 220) or retrieving data (e.g., from a storage device 223). Additionally, the media studio 212 may receive data from one or more data collectors 217. The data collectors 217 may include a variety of sensors that may provide data related to a recording event. The data collectors 217 may include one or more biometric sensors such as heart rate monitors, blood pressure monitors, etc.; movement sensors such as accelerometers, gyroscopes, etc.; location sensors such as global positioning systems, RFID tags, etc.; environmental sensors such as barometers, thermometers, light sensors, etc.; and other types of sensors which may provide data related to a recording event. The data collectors 217 may further include systems such as global positioning systems (GPS), weather tracking systems, etc.

As used herein, the recording event may refer to the actual event being recorded, for example, a football game or company picnic, including the environment, participants, camera 220 operators, media studio 212 operators, operator console 218 operators, viewers, audience, etc. related to the event being recorded. Further, the data collectors 217 may provide data, or may be included in one or more of the media devices 216, and provide data via, for example, a computing device in the media device 216.

The media studio 212 can be controlled by, and receive media input data from, an operator console 218, which may be remote to the media studio 212. The media studio 212 further can generate media output data and provide the media output data to media devices 216 (e.g., a viewer 222). The media processing system 210 allows a user to produce media output data at a location where the recording, or a portion of the recording, is taking place. Controlling the media studio 212 via a remote operator console 218 provides the user the freedom to move about the recording location while maintaining oversight and control over the production process.

A server 228 may also be communicatively coupled to the media studio 212, the media devices 216, and/or the data collectors 217 via the network 214. Additionally, the media processing system 210 may include a monitor 230, which may include a display device, communicatively coupled to the media studio 212.

A variety of types of data may be used by the media studio. For example, the data may include biometric data (e.g., heart rate, blood pressure, etc.) associated with a user of a camera and which may be used, e.g., to determine an excitement level of the user. As another example, the data may be data indicative of the quality of a media input item such as steadiness of a camera, contrast of an image, etc. Still further, the data may include location data or movement data associated with an object or participant in the event to be recorded (e.g., a player in a sports event, a ball being used in a sports event, etc.). Still further, the data may include global positioning data, weather data, light conditions, etc. related to the recording environment. Other types of data, collected from sensors, or, e.g., from other computing devices, may also be used for selecting the content for and/or generating the media output item.

The media studio 212 can receive multiple media input items simultaneously or substantially simultaneously, and can combine them into an aggregated media item for viewing via the operator console 218. An "aggregated media item," as that term is used herein, is a set of two or more of the media input items, arranged to be displayed at the same time on a user display (e.g., a touchscreen or other screen with projected or overlaid images). The media input items may be arranged such that they appear side by side, in rows, or in a picture-in-picture format within the user display. In addition, the aggregated media item may include, for example, a graphical user interface that is displayed on the user display and accepts user inputs. As described below, the media studio 212 may compress the aggregated media item prior to providing it to the operator console 218.

The media input items may be visual and/or audio data such as videos captured by a video camera or sounds captured by a microphone. The microphone may be integrated in a media device 216 or another device within media processing system 10, or may be a standalone media device 216 which can independently communicate with the media studio 212. The media input items may include, for example, streamed data or static data such as single digital photographs. The media studio 212 further can receive commands from the operator console 218, and can generate a media output item according to the received commands. The media output item may include data from one or more of the media input items.

As an example, the media studio 212 may receive four media input items, each of the four media input items received from a different media device 216. The media studio 212 may generate an aggregated media item including each of the four media input items, and transmit the aggregated media item to the operator console 218. A user of the operator console 218 may select, via a user interface, one of the four views in the aggregated media item to be included in the media output item. Based on a command received from the operator console 218, the media studio 212 may generate the media output item that includes the selected media input item. The media output item may be transmitted via a network 214 to be shared with viewers (e.g., streamed on an online streaming platform), or stored in a storage device 223. In one example embodiment, media studio 12 may be capable of only receiving and processing four media input items at a time. For example, media studio 12 may only include four video feeds or streams due to, for example, a limited number of inputs on media studio 12 or a limited amount of bandwidth utilization on the network that connects media studio 12 to media devices 16.

In addition to selecting one or more media input items to be included in the media output item, the media studio 212 may perform various media processing operations. The media processing operations may be performed based on commands received from the operator console. A non-limiting list of example processing operations that may be performed by the media studio 212 includes scaling, mixing, morphing, compositing, adding overlays (audio and/or video), among others. In addition, the media studio may perform operations such as object tracking, image stabilization, etc. The operation of the media studio 212 will be discussed in greater detail below.

The media studio 212 may further be programmed to recommend (e.g., to the operator console 218) media input items to be included in a media output item and/or to generate a media output item based on one or more predetermined rules. The predetermined rules may be, for example, inputted by a user. Alternatively or in addition, the predetermined rules may be dynamically learned over time by collecting and analyzing historical data of previous operator choices. For example, a processor included in the media studio 212 may be programmed to learn user preferences based on historical/previous choices and may include a hardware learning mechanism such as a neural network.

Communications between the media studio 212 and the media devices 216 and data collectors 217 (collectively, "networked devices" 216, 217) may occur via the network 214 and/or via one or more of direct connections 282 (e.g., wired and/or wireless connections, such as, for example, Bluetooth, IEEE 802.11, etc.). In general, the network 214 represents one or more mechanisms for delivering media content between the media studio 212 and the networked devices 216, 217. Accordingly, the network 214 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Example communication networks include wireless communication networks, local area networks (LAN) 224 such as a WiFi network or Ethernet, and/or wide area networks (WAN) 226 such as the Internet, etc.

In addition to the one or more networks 214, one or more wired or wireless direct connections 282 may be used to connect the media studio 212 to the media devices 216 or other devices in the media processing system 210. Direct connections may include, e.g., Bluetooth, Universal Serial Bus (USB), high-definition multimedia interfaces (HDMI), custom serial interfaces, etc. For example, one or more high-definition multimedia interfaces (HDMI) may be used to transfer data between a media device 216 and the media studio 212, or from the media studio 212 to a computer or television monitor or other display 230. The HDMI is a well-known proprietary audio/video interface for transferring uncompressed video data and compressed or uncompressed digital audio data from a HDMI-compliant source device, such as the media device 216, to a digital media processing device such as the media studio 212 or to the compatible computer monitor (e.g., a monitor 230).

The server 228 may be communicatively coupled to the media studio 212, the media devices 216, and/or the data collectors 217 via the network 214. The server 228 may include a communications circuit for communicating via the network 214, and may further include a memory and one or more processors configured to execute programs (i.e., sets of computer-executable instructions) stored in memory. The server 228 may, for example, receive media output items and store the media output items for future use.

Media content, such as the media input items, media output items, and/or multiview media items, may generally be delivered via the network 214 in a digital format (e.g., as compressed audio and/or video data) and may include media data and metadata. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), or according to some other standard or standards. For example, media content could be audio data formatted according to standards such as MPEG-2 Audio Layer III (MP3), Advanced Audio Coding (AAC), etc. Further, the foregoing standards generally provide for including metadata.

As noted, media devices 216 may include the viewer 222 may be used to display media output data received from the media studio 212, and may include a display such as a liquid crystal display (LCD) or plasma display. The media data may be received, for example, via the network 214 or via the direct connection 282. Examples of the viewer 222 include mobile devices such as mobile phones, tablets, and laptops and may further include devices such as digital televisions. The viewer 222 may receive, e.g., Full HD data, providing a resolution of 1920 by 1080. Data formats with other resolutions may also be used.

As further noted, media devices 216 may also include a storage device 223. Storage device 223 may store media data and provide an interface to allow the media studio 212 to access the data via the network 214 or via the direct connection 282. The media storage device may include one or more types of data storage such as read only memory (ROM), random access memory (RAM), flash memory, electrically programmable memory (EPROM), electrically programmable and erasable memory (EEPROM), embedded MultiMediaCard (eMMC), a hard drive, etc. Further, the media storage device 223 may include a processor, programmed to receive commands from the media studio 212. The processor may be further programmed, based on the commands, to retrieve media data items from data storage and send the media data items to the media studio 212.

Communications between the media studio 212 and the viewers 222/storage device 223 may be performed via the network 214. Additionally or alternatively, communications may be performed via the direct connection 282. For example, the storage device 223 may be connected to the media studio 212 via a Universal Serial Bus (USB) port, or other wired or wireless interface.

Figure 3:
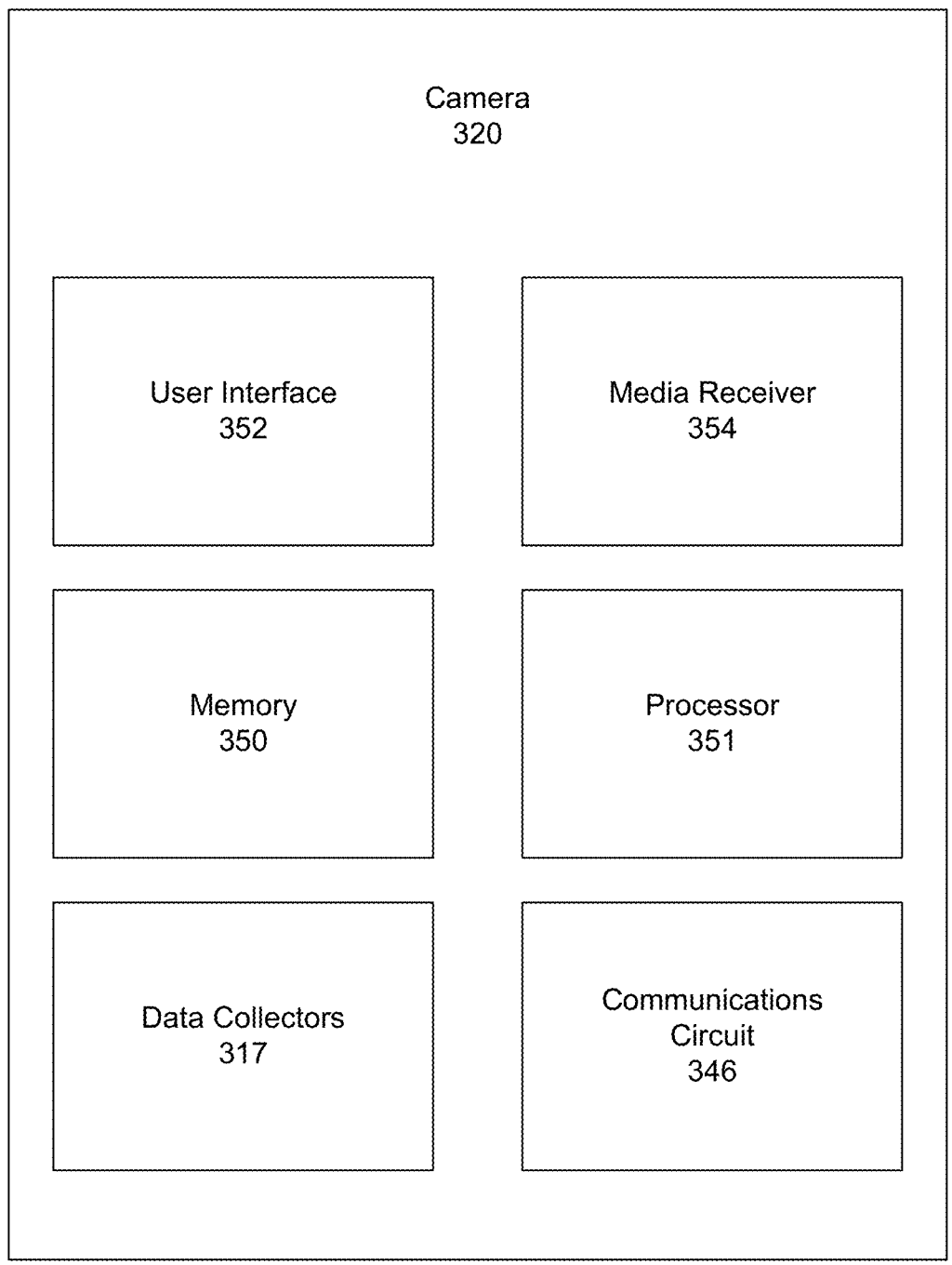
FIG. 3 illustrates a block diagram of an example camera for the media system of FIG. 2.

FIG. 3 illustrates a block diagram of an example camera for the media system of FIG. 2, according to embodiments of the present technology. The camera 320 may include a memory 350 and a processor 351, the memory 350 storing program code (i.e., computer-executable instructions) executable by the processor 351. The memory 350 may include video buffers which may be used for replays, applying video audio filters, and/or compressing and decompressing media data, among others. The processor 351 may be communicatively coupled to a user interface 352, a media receiver 354, a communications circuit 356, and/or data collectors 317. The camera 320 may capture media data (i.e., visual and sound data such as photographs and videos) and may transmit the media data via, for example, the network 214, to the media studio 212. Examples of a camera 320 include portable devices such as smartphones, tablets, laptops, digital cameras, security cameras, traffic cams, cameras transported by airborne drones, among others.

The media receiver 354 may include one or more data receiving elements for receiving media data. The collected media data may include visual data and/or audio data. The media receiver 354 may include, for example, one or more microphones for receiving sound data and CMOS or CCD image sensors for receiving image data.

The user interface 352 may be communicatively coupled to the processor 351 and may include one or more input devices such as a microphone, buttons, a touchscreen display, a mouse, a keyboard, a gesture-recognition device, switches, etc., for receiving input from the user. The user interface 352 may further include one or more output devices such as a display, lamps, speakers, etc. for communicating information to the user.

The data collectors 317, which may be in addition to the data collectors 317 shown in FIG. 2, may be used to determine, for example, operating conditions of the camera 320. Data collectors 317 may include accelerometers, gyroscopes, light meters, among others. The data collectors 317 may be used to measure, for example, movement of the camera 320 (shaking, tracking of an object), the direction the camera 320 is pointing, the light conditions under which the camera 320 is operating, etc. The data collectors 317 may provide data to the processor 351, which may, for example, send the data to the media studio 212 for additional processing. The data sent to the media studio 212 may be raw data, i.e., representative of data coming directly from sensors.

The camera 320 may receive data from, for example, the media studio 212. The camera 320 may also provide data to a user of camera 320 via, for example, the user interface 352. For example, the media studio 212 may determine, based on data received from the camera 320, that there is a problem with camera 320. For example, media studio 212 may determine that the camera 320 is shaking too much. Media studio 212 may make this determination by comparing received media input to a predetermined or dynamically determined (e.g., based on historical data collected over time) threshold. The media studio 312 may send this data to the camera 320, which may display the information on the user interface 352.

Figure 4:
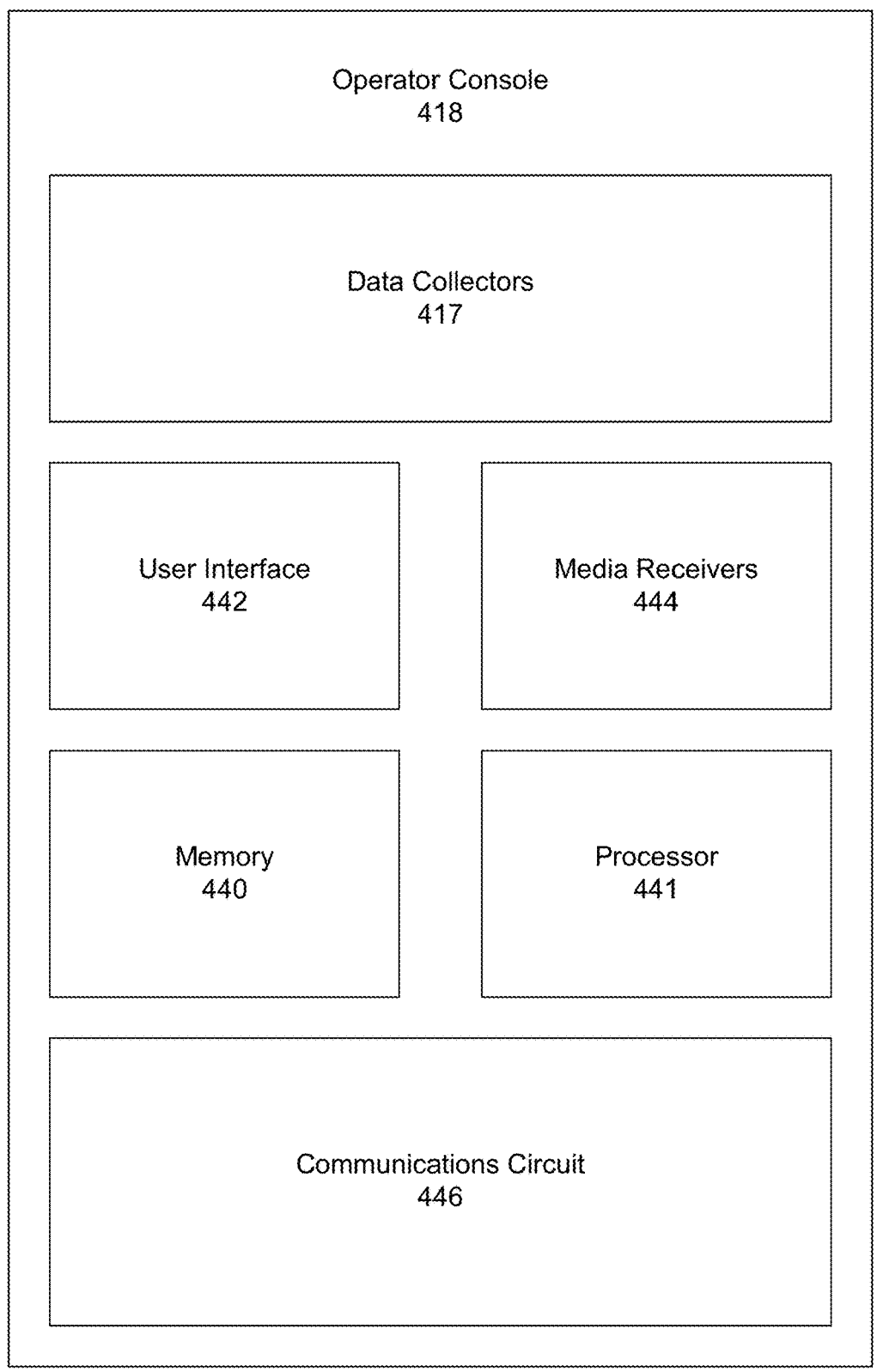
FIG. 4 illustrates a block diagram of an example operator console for the media processing system of FIG. 2.

FIG. 4 illustrates a block diagram of an example operator console for the media processing system of FIG. 2, according to embodiments of the present technology. The operator console 418 may be used to control the operation of the media studio 212. As shown in FIG. 4, the operator console 418 may include a processor 441 and/or a memory 440 (e.g., to store program code, i.e., computer-executable instructions executable by the processor 441). The processor 441 and/or memory 440 may be communicatively coupled to a user interface 442, a media receiver 444, a communications circuit 446, and/or data collectors 417.

The operator console 418 may include a user interface 442 may be communicatively coupled to the processor 441 and the user interface 442 may include one or more input devices such as a microphone, buttons, a touchscreen display, a mouse, a keyboard, a gesture-recognition device, switches, etc. for receiving input from the user. The user interface 442 may further include one or more output devices such as a display, lamps, speakers, etc. for communicating information to the user. All, or a portion of, the user interface 442 may be physically separate from the operator console 418. For example, the operator console 418 may be a tablet computer which projects its output to another screen (e.g., air-play) while the operator continues to control the media studio 212 from the tablet computer.

In addition to commands related to selecting media input items for display in the media output item, commands from the operator console 418 may include instructions to perform operations such as scaling, mixing, morphing, compositing, adding overlays, etc. Further, commands from the operator console 418 may include instructions to perform operations such as object tracking, image stabilization, etc.

The operator console 218 may include one or more media receivers 444. A media receiver 444 may be, for example, a digital camera, which may receive media data. A media receiver 444 may include, for example, a CMOS or CCD image processor for receiving visual data and a microphone for receiving audio data. The media data may include visual data such a still photographs and video recordings and may further include audio data such as a sound recording or soundtrack. The media receiver 444 may, for example, output the media data to the processor 441.

The operator console 218 may include a communications circuit 346 that is communicatively coupled to the processor 441 and/or is configured to communicate with the media studio 212 via, for example, the network 214 and/or through the direct connections 282. The communications circuit 446 may include a radio frequency (RF) transceiver for WiFi communications (typically 2.4 GHz or 5 GHz bands). The RF transceiver may communicate, for example, directly with a RF receiver included in the media studio 212. Additionally or alternatively, the communications circuit 446 may include, e.g., an Ethernet interface, a Universal Serial Bus (USB) interface, a Bluetooth transceiver, a high-definition multimedia interface (HDMI), etc. Alternatively, the communications circuit 446 may communicate with the media studio 212 indirectly (e.g., via an intermediate device). For example, the communications circuit 446 may communicate with a hotspot.

The operator console 418 may include a processor 441. Processor 441 of the operator console 418 may perform processing of the data it receives from other parts of the operator console 218 (processor 441 may be communicatively coupled to each of the user interface 42, the data collector 444, the communications circuits 446, and the data collectors 417) or other media devices 216. For example, the processor 441 may determine values such an excitement level, a quality level, etc. of the data and provide the determined values to the media studio 212. The data may be dynamic data which indicates the determined values as a function of time. Further, the operator console 418 processor 441 may, e.g., recognize objects within the media input item, perform audio filtering, and perform other media processing operations, and provide the results of these operations to the media studio 212.

The processor 441 may be programmed to control the operation of the media studio 212 based on inputs received from a user via the user interface 442. More specifically, the processor 441 may be programmed to receive a media content item (for example, an aggregated media item including one or more views from one or more cameras 220) and to display the aggregated media item via the user interface 442. The processor 441 may be further programmed to receive input from the user via the user interface 442. For example, the user may view the aggregated media item and select one of the views to be included in a media output item generated by the media studio 212. The processor 441 may send a command to the media studio 212 to include the selected view in the media output item.

Figure 5:
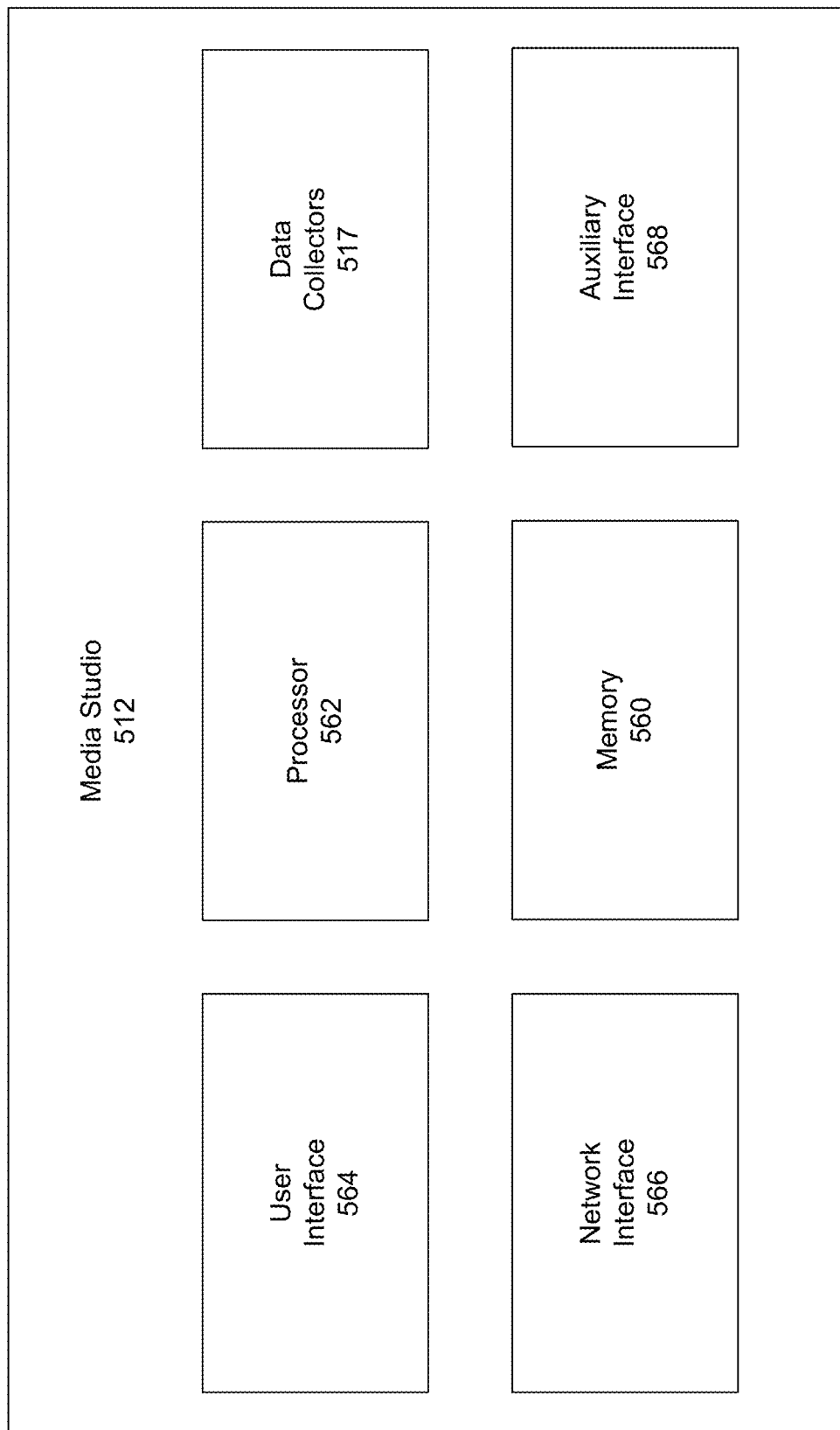
FIG. 5 illustrates a block diagram of an example media studio for the media processing system of FIG. 2.

FIG. 5 illustrates a block diagram of an example media studio for the media processing system of FIG. 2, according to embodiments of the present technology. The media studio 212 may include a processor 562 and an internal memory 560 (which, for example, may store program code, i.e., computer-executable instructions, executable by the processor 562). The processor 562 and/or internal memory 560 may be communicatively coupled to a user interface 564, a network interface 566, an auxiliary interface 568, and data collectors 517.

The internal memory 560 may include, for example, read only memory (ROM), random access memory (RAM), flash memory, electrically programmable memory (EPROM), electrically programmable and erasable memory (EEPROM), embedded MultiMediaCard (eMMC), a hard drive, among others, and may be used to store programs executable by the processor 562, as well as to store, for example, data representing inputs from the user, instructions received from the operator console 218, media data received from a remote media device 216, and/or media metadata, data collected by data collectors 517.

The user interface 564 may be communicatively coupled to the processor 562 and may include one or more output devices such as a display, lamps, speakers, etc. for communicating information to the user, such as an alarm or other notification. The user interface 564 may further include one or more input devices such as buttons, a microphone, a touchscreen display, a mouse, a keyboard, a gesture-recognition device, switches, etc. for receiving input from the user.

The network interface 566 may include one or more interfaces to the network 14. For example, the network interface 566 may include a hotspot, such as is known, for WiFi communications. The hotspot may include a router. The router may include a radio frequency (RF) transceiver for WiFi communications (typically 2.4 GHz or 5 GHz bands) and may receive multiple transmissions substantially simultaneously. The router may connect the processor 562 with media devices 216, such as those shown in FIG. 2. The router and an Internet client may also be used in combination to provide Internet access for media devices 216. Additionally, the network interface 566 may include a link to an Internet Service Provider (ISP). The link may be a mechanism for connecting to and communicating with the Internet Service Provider, such as, for example, satellite communications or a cable network. The link may include a transceiver and/or antenna for satellite communications (such as those, for example, in the Ka band, 218.3-30 GHz). The link to the ISP may receive, via the network 214, Internet protocol (IP) communications from, for example, media devices 216 and data collectors 517.

The auxiliary interface 568 may include one or more wired or wireless interface circuits which may be used, for example, to connect to one or more media devices 216. The auxiliary interface 568 may include a universal serial bus (USB) interface circuit to communicate with external USB devices, for example, a memory stick or memory back-up device. As another example, the auxiliary interface 568 may include a MicroSD interface, as is known, to store data on and retrieve data from a MicroSD data card. Further, the auxiliary interface 568 may include, for example, a Bluetooth interface for wireless connection to a media device 216. The auxiliary interface 568 may also be used to connect to data collectors 517.

Processor 562 may generally be programmed to receive one or more media input items from one or more media devices 216. Processor 562 may, for example, generate an aggregated media item. The aggregated media item may include, for example a picture-in-picture (PIP) display, wherein two or more of the media input items are displayed at the same time (e.g., side by side). The media studio 212 may transmit the aggregated media item via the network 214 to the operator console 218. Processor 562 may be further programmed to receive commands from the operator console 218. Based on the commands, the media studio 212 may generate a media output item. The processor 562 may select data from one or more of the media input items to include in the media output item. In addition, the media studio 212 may perform media processing operations based on predetermined rules for generating the media output item.

Referring back to previous figures, processor 562 may output the media output item to viewers 222, to the operator console 218, and/or to other display devices. Additionally or alternatively, the media studio 212 may output the media output item to a server 228, or to storage devices 223, where the media output item may be stored for future use.

Figure 6:
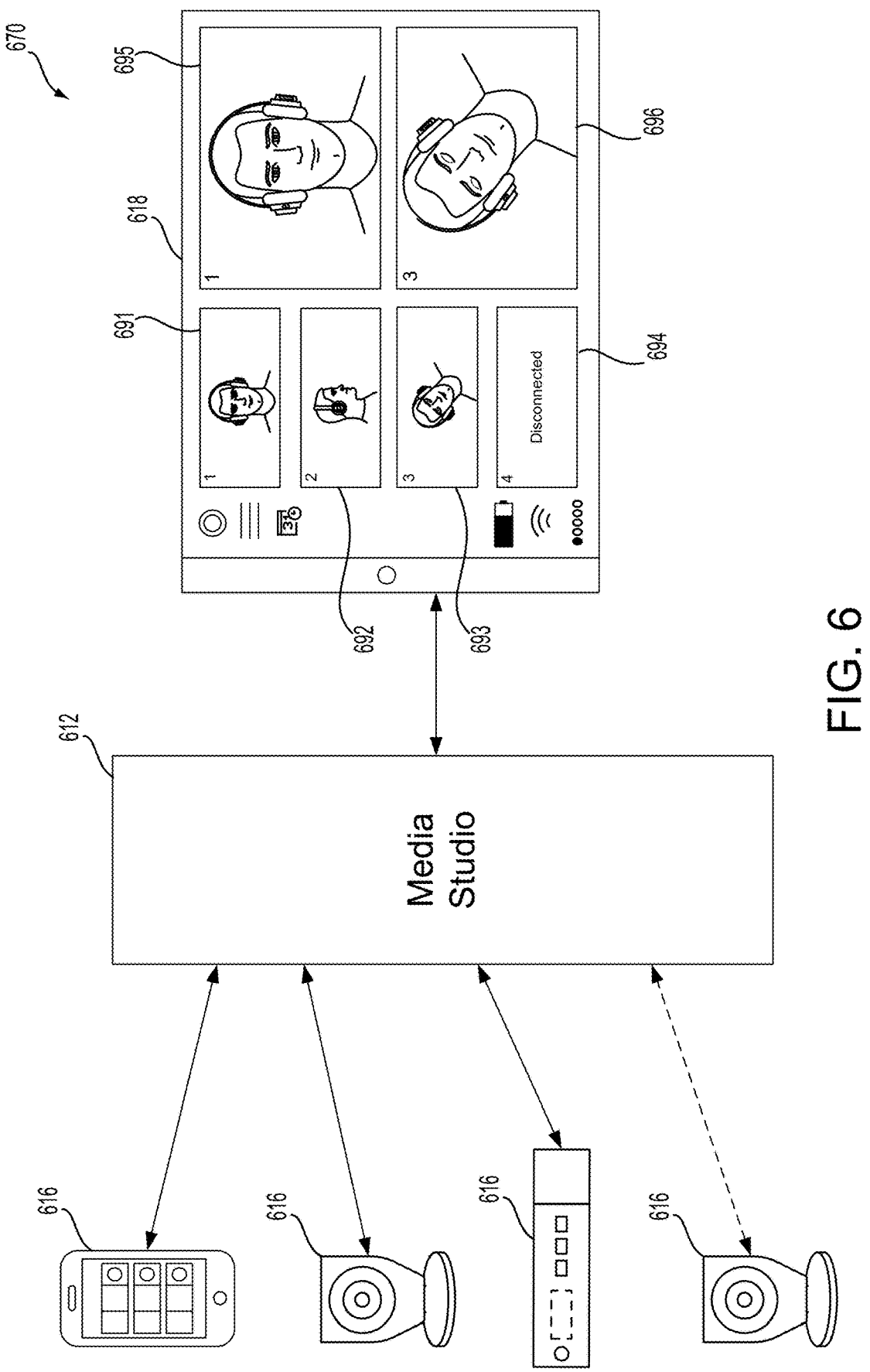
FIG. 6 illustrates a block and flow diagram showing communication between media devices and an operator console via a media studio, according to embodiments of the present technology.

FIG. 6 illustrates a block and flow diagram 670 showing communication between media devices and an operator console via a media studio, according to embodiments of the present technology. As noted, a media processing system may include media devices (such as media devices 616), an operator console (such as operator console 618), and a media studio (such as media studio 612). More specifically, the media studio 612 may receive data and inputs from a variety of different sources, and use that data and inputs to produce an output for display. For example, the media studio 612 can receive multiple media input items simultaneously or substantially simultaneously, for example from media devices 616, and can combine them into an aggregated media item for viewing via the operator console 618. Furthermore, for example, the media studio 612 can be controlled by, and receive media input data from, an operator console 618, which may be remote from the media studio 612. The media studio 612 further can receive commands from the operator console 618, and can generate a media output item according to the received commands. For example, a user of the operator console 618 may select, via a user interface, one of the four views in the aggregated media item to be included in the media output item. Based on a command received from the operator console 618, the media studio 612 may generate the media output item that includes the selected media input item. In addition to commands related to selecting media input items for display in the media output item, commands from the operator console 618 may include instructions to perform operations such as scaling, mixing, morphing, compositing, adding overlays, etc. Further, commands from the operator console 618 may include instructions to perform operations such as object tracking, image stabilization, etc.

Operator console 618 may include a graphical user interface. The graphical user interface in operator console 618 includes six tiles or other items 691-96. When media studio 612 receives one or more media input items, the items may be displayed on operator console 618 in tiles 691-694. For example, a first media input item may be displayed on tile 691, a second media input item may be displayed on tile 692, a third media input item may be displayed on tile 693, and a fourth media input item may be displayed on tile 694. Media devices 616 may include four (or more or less) of the same device and may capture video or other media of an environment from different angles, or may be different devices that capture different types of media. In either instance, media input items captured from a media device 616 may be displayed on operator console 618. When fewer than four media devices 616 are connected to media studio 612, and therefore fewer than four media input items are received by media studio 612, one or more of tiles 691-694 may not display a media input item, and instead may be blank or otherwise indicate that no media input item has been received to be displayed on that tile.

Tiles 695 and 696 may be used for other purposes associated with operator console 618. For example, a user of the operator console 618 may select, via the graphical user interface, one of the four views in the aggregated media item to be included in the media output item (e.g., at tiles 691-694). When a user selects one of the four views, the media input item selected by the user may appear in, for example, tile 696. For example, tile 696 may be used by the user to manipulate the media input item before it is finalized as an media output item. The media output item may be broadcasted or streamed over the internet or otherwise shared. The media output item, once finalized, may be displayed in tile 695. Even though certain tiles within operator console 618 have been described, they are examples only. The tiles may be interchangeable, moveable, or used for different purposes as may be provided for by the software application being used by operator console 618 to present the tiles on the graphical user interface.

Figure 7:
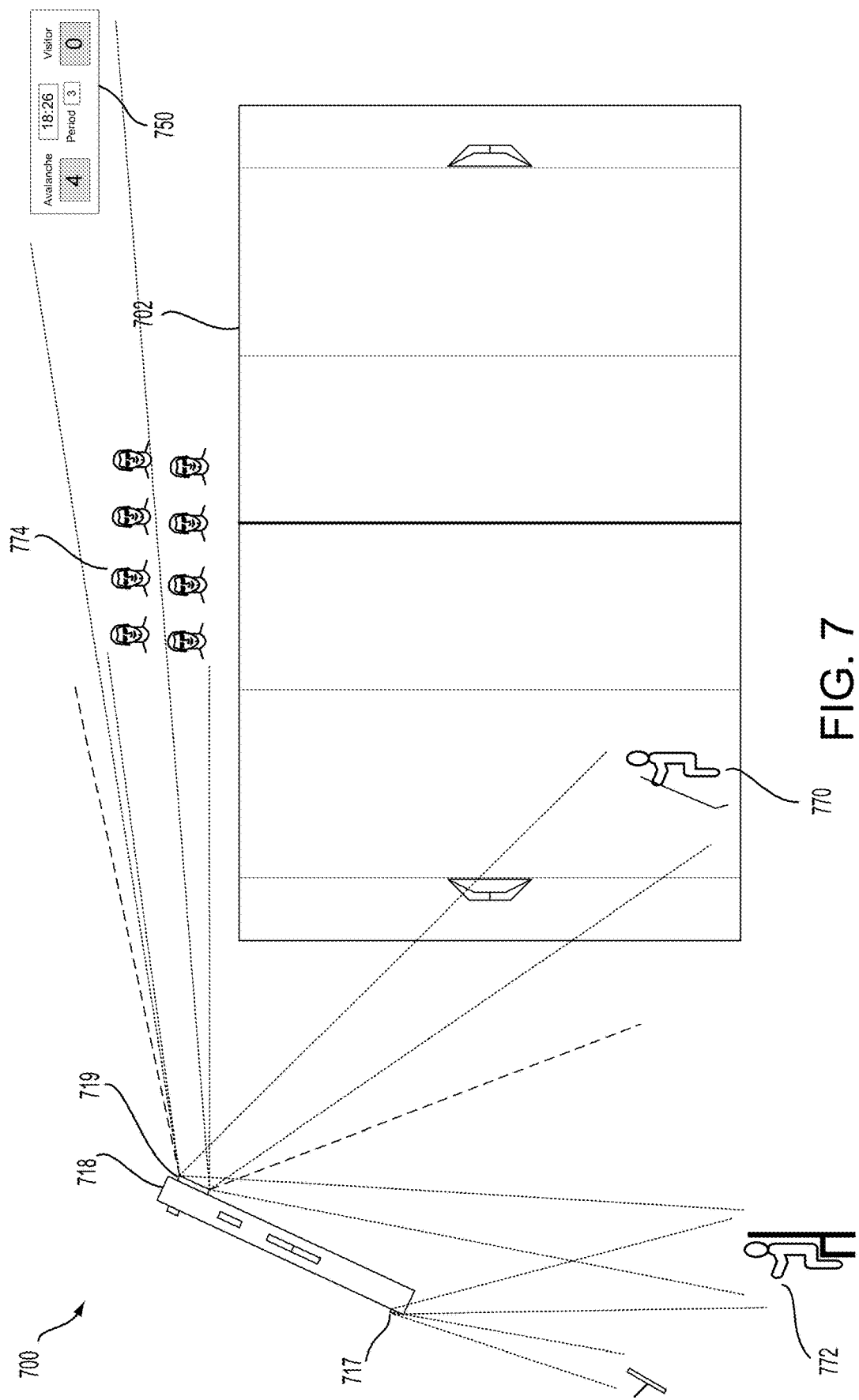
FIG. 7 illustrates an environment including an operator console and an entertainment venue, according to embodiments of the present technology.

FIG. 7 illustrates an environment 700 including an operator console 718 and an entertainment venue 702, according to embodiments of the present technology. As noted, the media processing system may process multiple media input items. For example, a media studio can receive multiple media input items simultaneously or substantially simultaneously, and can combine them into an aggregated media item for viewing via the operator console 718. The multiple media input items may be used to generate an output or final video stream, video segment, or other content item that includes portions of the multiple media input items. The media processing system, including the media studio, operator console and media devices, can assist a user in generating such a video (or other) content item.

Even if a content item is described herein as being a "video" content item or as containing video, content items described herein may include other types of data, and in some embodiments may not include video content at all. Furthermore, even if a process, action, or step is described as being performed by an operator console (e.g., operator console 718), the process, action, or step may also be performed by a media studio/hub as described herein. For example, if the operator console 718 is described as being communicatively or otherwise "connected" to a media device or another device, they may be connected through the media studio or may be connected directly.

The media processing system, via the operator console 718 (or media studio in communication with the operator console), may automatically and dynamically determine different characteristics of the user's video content item. For example, the media processing system may, upon start-up of the operator console 718 and/or the software application on the operator console 718, determine a purpose of the user video content item before the video content item has been generated, or even before video streams or other data have been collected to be used as part of the final video content item product. While the purpose may be selected by a user (e.g., from a drop-down menu on the application), automatically determining a purpose may require less work from the user to ultimately generate the content item. Examples of a "purpose" of a user content item may include for the content item (and/or the user) to become popular, making people laugh, capturing and communicating major personal experiences, making their own short films, among others. These more general purposes may also be narrowed even further. For example, the purpose of "making people laugh" may be further and more specifically defined as silly, witty, and/or slapstick.

A variety of different kinds of data may be collected to help make a determination of purpose, including audio/verbal input from the user or other people near the operator console or other media devices (e.g., speak into mic, capture from actions associated with preparing the content item, etc.), location or situation of the media processing system, among others. Data associated with other events occurring in the area of the location of the media processing system may be used, and that data may be collected using sensors from the media processing system or data available on the Internet (e.g., social media). For example, operator console 718 may include a video camera 719, a microphone 717, a temperature sensor, a gyroscope, or other data sensors or data collectors. These data sensors and data collectors may collect a variety of different types of data associated with objects or events in the environment. For example, the video camera 719 or microphone 717 may collect data (e.g., video, audio, etc.) associated with an event taking place on the entertainment venue 702, such as, for example, video of hockey player 770, noises the hockey player 770 makes, or other data. In another example, the video camera 719 or microphone 717 may collect data associated with fans 774 at the entertainment venue, including facial or other bodily reactions they make, noise (e.g., cheering) they make, among other types of data. In another example, the video camera 719 or microphone 717 may collect data associated with scoreboard 750, including alphanumeric characters on the scoreboard, noise coming from the scoreboard, among other types of data. In another example, the video camera 719 or microphone 717 may collect data associated with an event worker 772 or the television the event worker is watching (e.g., the event at the entertainment venue may be on the TV, other events or information associated with the event or entertainment venue may be on the TV, etc.), among other data. The purpose may be determined by analyzing the variety of different types of data collected from the environment, and using the data and analysis to determine a likely purpose or a set of potential purposes. This analysis may include determining characteristics of the environment, assigning weights or probabilities to each characteristic depending on the system's perceived value or strength for determining the actual purpose of the user content item.

The purpose or purposes may be automatically determined based on other factors as well, including saved historical data associated with the user, the location, or other characteristics associated with the current user content item. For example, after a purpose has been selected by a user to confirm which purpose is correct, the prediction from the media processing system, and any factors or weights used to determine the prediction, may be tagged or associated with the correct purpose so as to inform the media processing system in future decisions, making future decisions more accurate.

A set of potential purposes may then be sent to the user for the user to select the correct purpose. For example, the operator console 718 may output the set of potential purposes in a list or other form on a display associated with the operator console 718 for the user to view and select from.

The media processing system, via the media studio operator console 718, may automatically and dynamically determine other characteristics of the user's video content item, either using the purpose or otherwise. For example, the media processing system may make determinations about the user content item and the user's intent in order to execute pre-production or pre-processing steps to setup the environment and the media processing system devices for shooting. The media processing system may determine crew, actors, or characters for the user video content item before the video content item has been generated, or even before video streams or other data have been collected to be used as part of the final video content item product. For example, the media processing system may identify people in the environment that it may be a part of the user video content using a variety of different techniques. In one embodiment, the media processing system may use the determined purpose, along with data collected from the environment, to determine which people are in the environment. For example, if the media processing system determined that the purpose of the video was to create a hockey player recruiting video, it may recognize hockey player 770 and determine that hockey player 770 is a character in the user content item since hockey player 770 is a hockey player and is associated with (e.g., friends with on social media, went to school together, etc.) the user of operator console 718, or of the whole media processing system. In another example, the media studio (e.g., via operator console 718 or other media devices) may identify person 772 by detecting that person 772 is holding a mobile device that may be used as a camera in the media processing system. Person 772 may already be present for the purpose of shooting the user content item, or may be a stranger that the media processing system recruits to join the media processing system.

The purpose, or other data, may also be used to determine characteristics of the final user content item (e.g., video) and/or how a consumer consumes the user content item. For example, the purpose and/or other data may be used to determine, by the operator console, media studio, or other device, one or more consumption characteristics of the content item. A consumption characteristic, for example, may be a characteristic associated with consumption of the user video by a consumer. For example, consumption characteristics may include a change in audio, text, brightness, length, FPS, speed, vertical/horizontal, etc. More specifically, the purpose may be used to determine whether the content item is better consumed vertically or horizontally on a mobile device (or, if either is fine, it may determine that both versions may need to be generated).

The data collected by the operator console 718 and any other media devices may be used to match people and/or their devices with the purpose and other characteristics of the user content item. For example, data associated with a detected person or device may include their relationship with the media processing system user, characteristics of the person, abilities of the person, proximity of the person to the user (e.g., using photo scan, audio recognition, wireless device detection, etc.), quality and/or rating of other content items that the person has been involved with (e.g., identified by saved historical data associated with other content items the user has produced), the type of device or camera they have, etc. Roles proposed by the operator console 718 may be presented to the user to confirm or edit the roles, and the roles may also be transmitted to each of the detected people and/or devices to determine if they want to or can participate. The operator console 718 and/or other media devices may also collect data regarding potential objects that could be used as props in the user content item, and that data may be analyzed to determine which objects may work best with the determined or received purpose of the user content item. After a person or object has been detected, data may be collected about each person or object. For example, a person may be identified as a person who participated in a past video associated with the user, or videos may be identified as videos that that person "likes" (e.g., via social media) or generated themselves.

The media processing system, via the media studio or the operator console 718, may automatically and dynamically determine other characteristics of the user's video content item. For example, the media processing system may determine recommended locations in which data (e.g., video streams) can be captured for the content item to be generated. Various factors could contribute to a determined location, including geographic location and proximity to different types of environments, the user and the user's tastes (e.g., identified by saved historical data), etc. Over time, information associated with each location may be dynamically updated based upon content items the user has produced in each location. Using data associated with a location, scenes from a screenplay or frames from a storyboard may be assigned to specific sub-locations within a location (e.g., a room in a house). Furthermore, cameras, props and/or people may be assigned based on information associated with the location gathered over time as well.

The media processing system, via the media studio or the operator console 718, may automatically and dynamically determine other characteristics of the user's video content item. For example, the media processing system may determine recommended duration and/or dates and times in which data (e.g., video streams) can be captured for the content item to be generated. The media studio and/or the operator console, or other devices in the media processing system, may determine the duration or timing based on what information it knows about the demands of the content item, or individual scenes of a video content item. The system may make more general recommendations based on the data it has collected, including, for example, weather such as rain (e.g., delay scene), time of day (light, type of light, etc.), time of year (temperature, amount of daylight, etc.), among others. In another embodiment, the system may make recommendations about the environment or to specific devices based on the availability or bandwidth available on a network that the system's devices communicate over. For example, if the network has insufficient bandwidth, the system may instruct the devices (or a subset of the devices) to delay transmitting the data (e.g., video stream) they collected in order to ensure it reaches the media studio (and the operator console), or to ensure it reaches the media studio (and the operator console) in a synchronized fashion.

After a set or list of people (possibly designated as a character, crew member, or actor, for example), a set or list of objects, or recommendations of other characteristics associated with the content item have been determined, these lists may be transmitted to the user of the media processing system for viewing or for selection of which people and objects the user would like to use in the user content item. The lists may be, for example, displayed by the operator console 718 on a display associated with (e.g., part of or communicatively connected to) the operator console 718. Data associated with each person and/or object may also be presented to the user, such as other content items associated with the person or object, characteristics about the person or object, preferences of the person, etc. The presented and/or selected characters and props may be determined using one or more screenplays and/or storyboards as discussed further with respect to FIG. 11.

Although herein the user video content item may be described as being generated by the operator console, or that data used to generate the user video content item may be analyzed by the operator console, it should be understood that other devices (e.g., other media devices) within the media processing system may perform these actions, for example using data (e.g., video streams) received or collected by the operator console. In certain embodiments, a separate operator console device may be excluded from the system since one or more other devices in the media processing system may perform the functions of the operator console.

Figure 8:
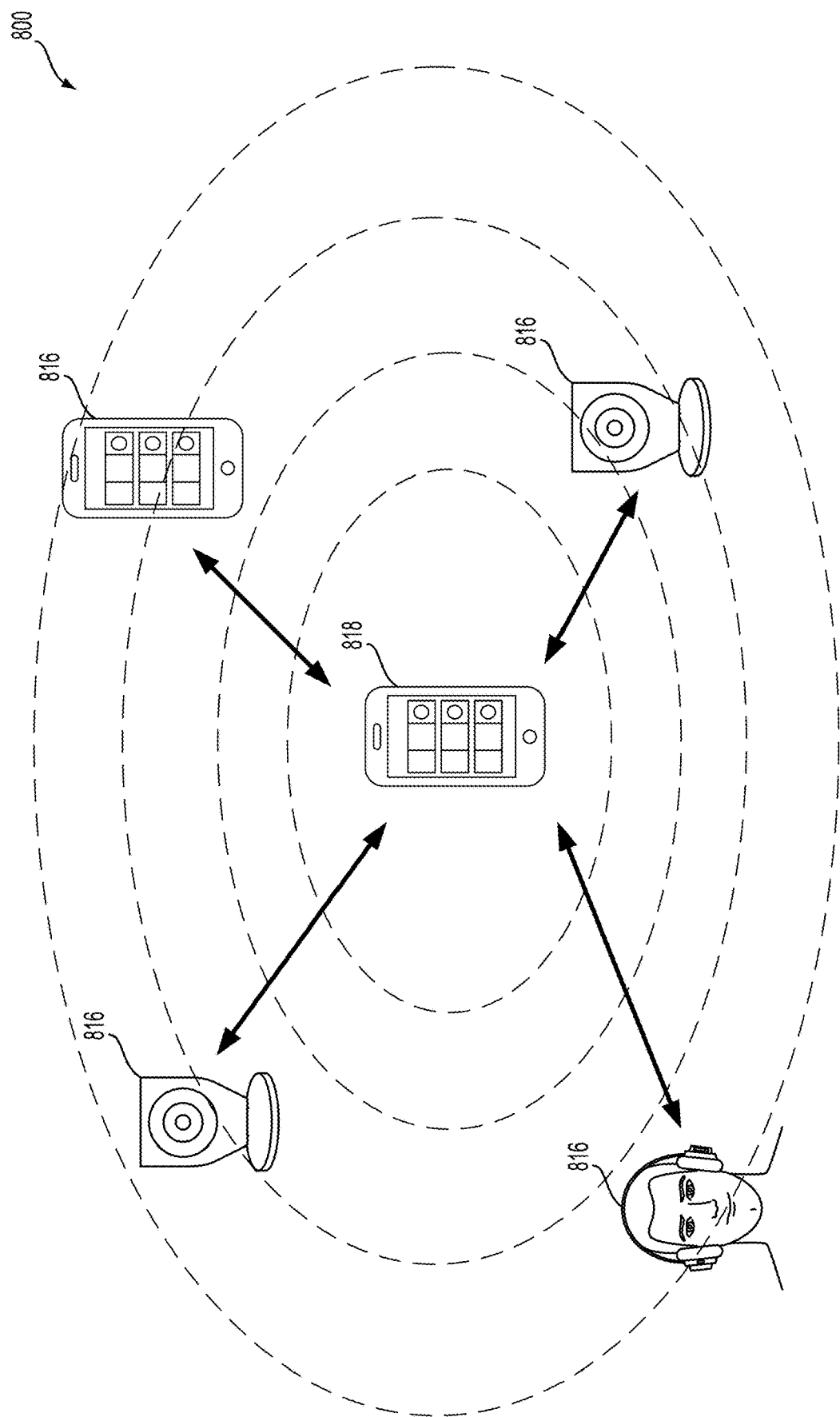
FIG. 8 illustrates a set of media devices communicating with each other in an environment, according to embodiments of the present technology.

FIG. 8 illustrates a set of media devices 816 communicating with each other in an environment 800, according to embodiments of the present technology. For example, media devices 816 may include video cameras, mobile devices (e.g., mobile smart phones, mobile tablets, etc.), Bluetooth headsets, IoT devices, security system devices, set-top boxes, among others. The media processing system may identify which media devices, such as which video cameras, are available to be used with the media processing system. In one example, a user may input which devices are available. The user may connect each available device to the media processing system using a local network or other protocols. As discussed further herein, cameras may also be detected by the media studio, operator console, or other devices in the media processing system. Certain devices may then be selected to perform certain actions based on certain factors, including the functionality of the devices themselves, the quality of the camera/lens, the purpose of the content item, duration of the content item, historical data associated with the functionality and/or success of the device, among others.

The environment may also include an operator console 818, which may also be a media device 816, as described herein. Operator console 818 may be indistinguishable from a media device 816 except that operator console 818 is configured to control a media studio in the environment. Operator console 818 may execute a client software application that includes a user interface for requesting content from the media studio, or directly from other media devices 816, and for viewing that content. Operator console 818 may, directly or via the media studio, also request content from devices other than media devices, such as from data collectors, as described herein. Data collectors may also be built into the operator console 818, such as a microphone or other sensor, or may be built into any of the other media devices 816.

Even though operator console 818 may collect data on its own, such as via its own built-in sensors, operator console 818 may benefit from collecting data from other sources. For example, operator console 818 may collect streams of video data from multiple sources and combine them into the software application for a user to view, and select for presenting. However, operator console 818, and its executed software application, may operate on their own without additional media devices or data collectors communicatively connected to it. In other words, all of the multiple media devices 816 shown in FIG. 8 may not be connected to operator console 818 immediately upon start-up of the software application. Instead, operator console 818 may detect those other devices and connect to them in order to collect data, such as video streams, from them. The operator console 818 may also, either directly or via the media studio, contact people associated with the detected devices to determine if they would be interested in participating in generating the user content item, such as by generating a video stream to be sent to the operator console 818. In another embodiment, media device 816 that are already associated with the user or operator console 818 may already be communicatively connected to the operator console 818 or other media devices 816 in the network of devices, and therefore those devices may already be known to be participating in the data collection and/or generation of the user content item.

Figure 9:
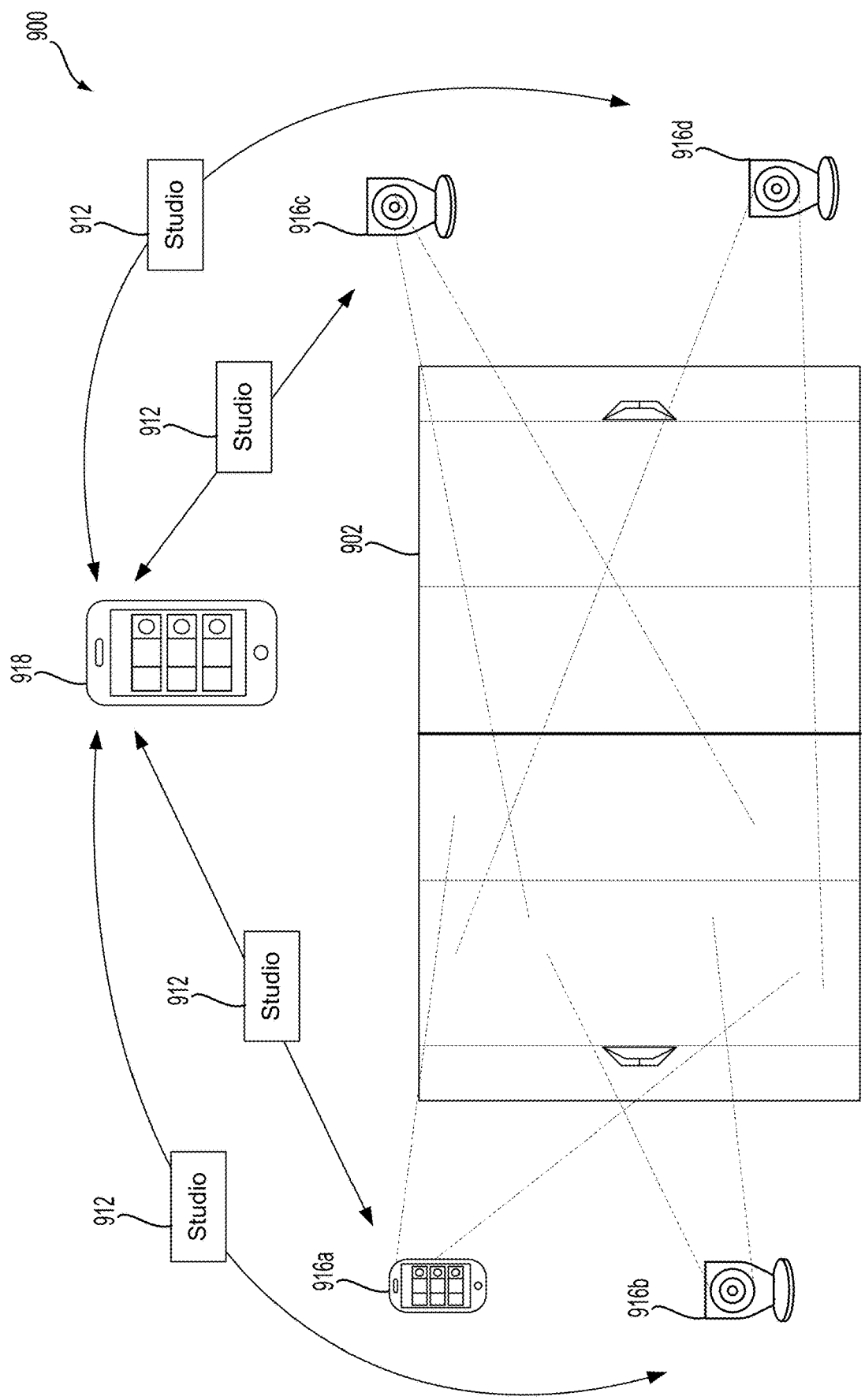
FIG. 9 illustrates an environment including an entertainment venue, an operator console, and media devices capturing data from the environment as part of a media processing system, according to embodiments of the present technology.

FIG. 9 illustrates an environment 900 including an entertainment venue 902, an operator console 918, and media devices 916 capturing data from the environment 900 as part of a media processing system, according to embodiments of the present technology. Media devices 916 may capture data, such as video content, associated with an environment from different angles or perspectives in order to capture a scene in multiple different ways, even though the devices are present in the same environment. Specifics about how each device is used, including its exact or approximate location, the direction it faces, the angle it faces, among other specifics may be chosen or automatically determined based on the purpose of the user content item, the environment, data collected about the environment, among other factors. For example, using data collected and associated with the environment 900, including data associated with the entertainment venue, people in the environment, objects in the environment, media devices in the environment, among other information, the media processing system may determine locations for each media device 916 to be placed.

The media devices 916 may be predetermined media devices associated with the user and the operator console so that the user may place the media devices 916 at locations in the environment based on the user's preferences and/or data collected about the environment. In another embodiment, if one or more media devices 916 are not previously associated with the user, then the operator console may communicate (e.g., transmit and receive communications via the media studio) with those media devices (e.g., via the media studio) to communicate with users of the media devices or to send commands to the media devices to take actions (e.g., begin recording video, capture an image, etc.) if the user of the media device has previously agreed that the media device can participate in data collection. Each media device, and each video stream or other data captured by each media device, may be controlled by the operator console 918. As shown in FIG. 9, each media device may capture data associated with a specific location (e.g., a specific portion of the ice of the hockey rink) or may capture data associated with different locations or aspects (e.g., audio, events, etc.) of the environment.

After data has been collected about a general or specific location, that data may be associated with that location (e.g., using tagging or grouping), and stored for future use. For example, a profile associated with a location may be generated, and the data associated with that location may be stored or somehow associated with that location profile. Therefore, if the user decides to generate a future content item in that same or a similar location, the profile for that location may be accessed, and the data from previous shoots or content items from that location may be used for future content items. The location profiles and data associated with the profiles may be dynamically updated over time so that the system becomes smarter and smarter over time, and can make more accurate decisions using more data analytics for future decisions and for the generation of future content items. This process of storing historical data, dynamically updating this historical data, and using that data later to improve future shoots and content items may be applied to any of the environment, content item, or user characteristics or preferences described herein.

Figure 10:
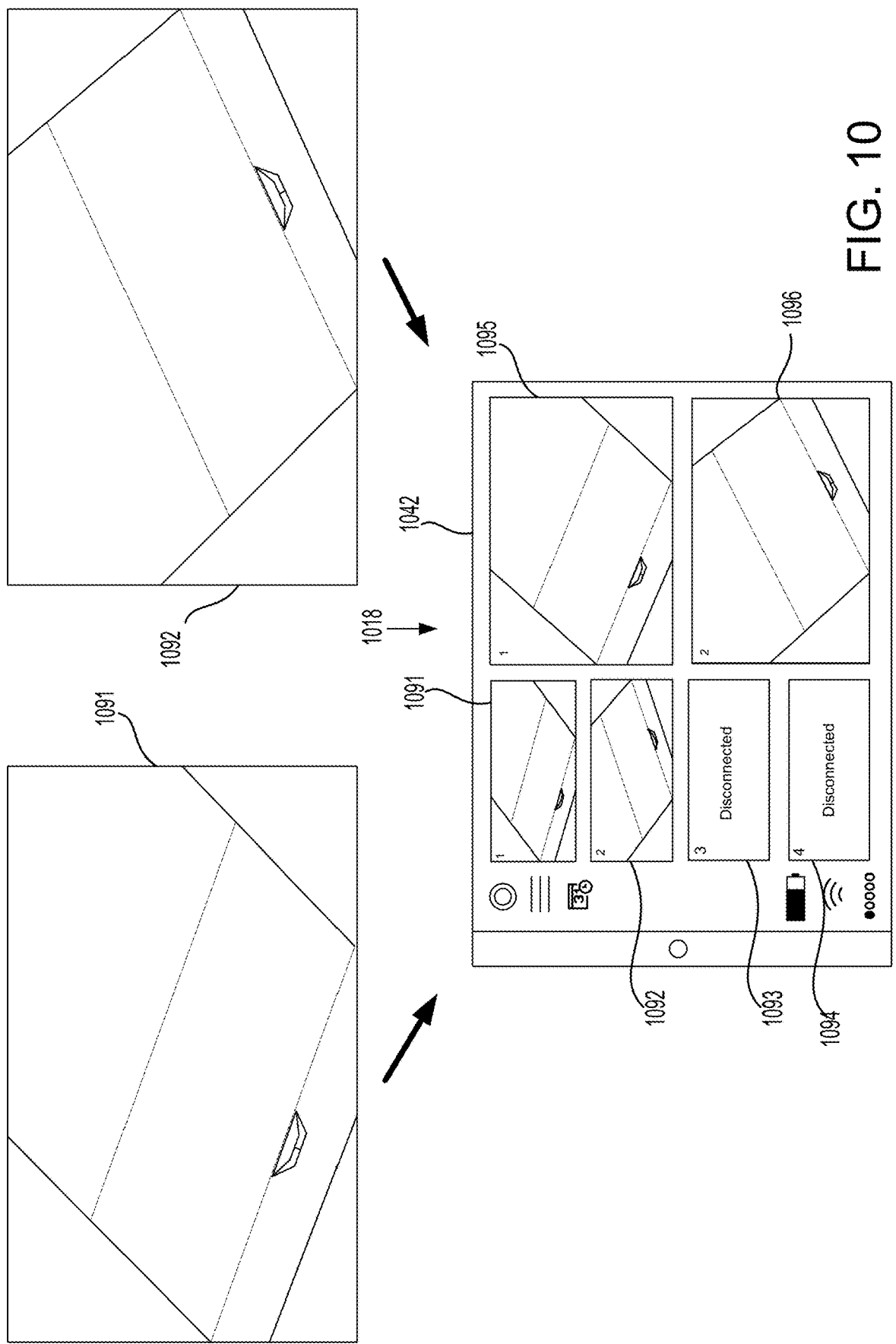
FIG. 10 illustrates screenshots of example video streams from media devices and a screenshot of a display or user interface associated with an operator console, according to embodiments of the present technology.

Either after or simultaneous with capturing data, media devices 916 may transmit data to the operator console 918 (directly or via the media studio), for example via a media studio 912, to be viewed on the operator console 918, for example as described further with respect to FIG. 10. As noted, the data, such as video streams, may be presented to the user via the operator console, and may be selected and/or manipulated by the user at a display associated with the operator console.

FIG. 10 illustrates screenshots of example video streams from media devices and a screenshot of a display or user interface 1042 associated with an operator console 1018, according to embodiments of the present technology. As described with respect to FIG. 9, media devices 916 may capture data, such as video content, associated with an environment from different angles or perspectives in order to capture a scene in multiple different ways, even though the devices are present in the same environment. Furthermore, either after or simultaneous with capturing data, media devices 916 may transmit data to the operator console 918, for example via a media studio 912, to be viewed on the operator console 918. Tiles 1091 and 1092 show screenshots of video streams from different media devices, where the different media devices are capturing media input items (e.g., video content) of the same environment (e.g., an event at a hockey rink) from different angles. For example, screenshot 1091 shows video content captured by media device/camera 916*b* and screenshot 1091 shows video content captured by media device/mobile phone 916*a*.

As further shown in FIG. 10, video content captured by media devices 916*a* and 916*b* are transmitted by their respective devices to the operator console 1018 (e.g., via a media studio), and are presented to the user on display 1042 of operator console 1018. When the media studio receives one or more media input items, the items may be displayed on operator console 1018 in tiles 1091-1094. For example, a first media input item may be displayed on tile 1091, a second media input item may be displayed on tile 1092, a third media input item may be displayed on tile 1093 (none at the displayed time, so "disconnected"), and a fourth media input item may be displayed on tile 1094 (none at the displayed time, so "disconnected"). When fewer than four media devices are connected to the media studio, and therefore fewer than four media input items are received by the media studio, one or more of tiles 1091-1094 may not display a media input item, and instead may be blank or otherwise indicate that no media input item has been received to be displayed on that tile, as shown with tiles 1093 and 1094 in FIG. 10. Tiles 1095 and 1096 may be used for other purposes associated with operator console 1018. For example, a user of the operator console 1018 may select, via the graphical user interface, one of the four views in the aggregated media item to be included in the media output item (e.g., at tiles 1091-1094). When a user selects one of the four views, the media input item selected by the user may appear in, for example, tile 1096. The media output item, once finalized, may be displayed in tile 1095. The tiles may be interchangeable, moveable, or used for different purposes as may be provided for by the software application being used by operator console 1018 to present the tiles on the graphical user interface.

Figure 11:
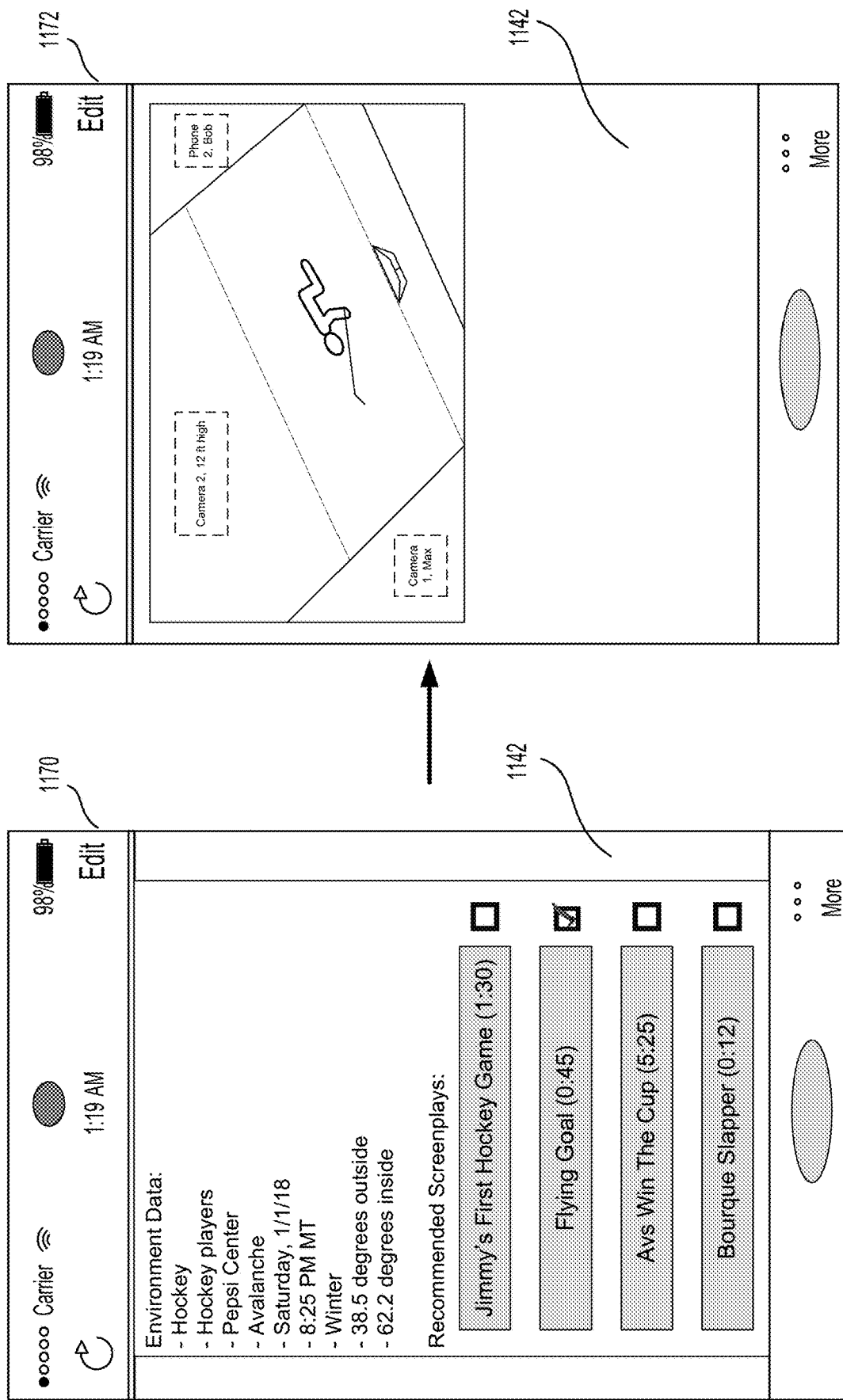
FIG. 11 illustrates a transition of screenshots from an operator console of the media processing system, according to embodiments of the present technology.

FIG. 11 illustrates a transition of screenshots from an operator console of the media processing system, according to embodiments of the present technology. As described herein, the data collected by the operator console and any other media devices may be used to match people and/or their devices with the purpose and other characteristics of the user content item. For example, as shown in screenshot 1170, the media processing system may use the collected data to generate a list of possible screenplays for the user to choose from. For example, for a specific combination of purpose, duration, and variation, a screenplay is suggested that consists of a list of scenes with characters, approximate setting, and an example dialogue for the characters, among other possible features or characteristics.

In order to generate the list of recommended screenplays, the media processing system identified pieces of environment data/information that were collected as being associated with the environment, and more specifically to the hockey event taking place in the environment. For example, the media processing system identified hockey players, the Pepsi center venue, the Avalanche team, a time of 8:25 PM MT (which is, for example, when an average professional hockey game would be played), the season of winter (when the professional hockey season takes place), among others. These pieces of environment data could then be analyzed to identify the recommended screenplays based on what screenplays might be most relevant to the user, the environment the user is in, the purpose of the user's content item, among other factors. The screenplays may be full screenplays with suggested specific language, or may be more of a template with a looser structure.

Instead of or in addition to recommending one or more screenplays for use by the user in generating the user content item, the system may use the environment, user, and content item data to recommend a duration of the content item. The duration may be specific (e.g., an exact or near exact amount of time), or it may be more general (e.g., presented in a range or in a group of times). The recommended durations may be associated with one or more specific screenplays, or may be a separate recommendation. Furthermore, the recommended duration may be used to determine which screenplays should be recommended to the user for that user content item. For example, the database of screenplays may be filtered to only provide screenplays to choose from for the recommendation that fit the recommended duration. Alternatively, the different factors may be ranked or weighted, determined by predetermined user preference or by learning user preferences over time or determined by the data associated with the environment and/or content item, so that screenplays of different durations may be available (e.g., if the content or other characteristic of the screenplay is more important to the user for this content item). This system of weighting different characteristics may also be used in order for the system to make a determination about what purpose, people, props, locations, etc. may be used or recommended to the user for use. For example, the user may input and update user preferences associated with weights. The weights may be specific to certain characteristics, or may be specific to certain types of content items.

The recommended screenplays may be chosen from a database of stored screenplays, which may include both the user's previous screenplays and screenplays produced by third parties. Each time a new screenplay is developed, either from scratch or from changing a screenplay already developed, the new screenplay can be added to the database of screenplays to be searched through later. The database may be stored locally on one of the devices in the media processing system, or it can be stored externally (e.g., in a cloud sever that can be accessed by the media processing system. If provided/uploaded by users, metadata may be assigned to a screenplay based on content items that used it, how the screenplay was used, which users used it, etc., and the metadata can help future users more accurately determine how useful the screenplay might be for their content item. In other words, the screenplays may be dynamically crowd sourced and generated over time by users. Users may also rate the screenplays and record user "likes", shares, etc. and adapt the best ones for use in database.

A user may select one or more of the screenplays to work from for generating the user content item. For example, in the embodiment shown in FIG. 11, the user has selected the "Flying Goal" screenplay, which is shown as being forty-five seconds long. After the user has selected the screenplay, the application may present to the user one or more storyboards associated with the screenplay. For example, a storyboard associated with the selected "Flying Goal" screenplay is shown in screenshot 1172. A story, such as one described in a screenplay, can be viewed, and executed, as a collection of storyboard images. Each frame of a scene may have an illustration that visualizes the frame. The frame may be different for each story purpose, variation, and scene purpose, so it may be specific to the user and the user's content item. Furthermore, each scene may be divided up into several segments, each segment having a different frame. As shown in screenshot 1172, frames may be overlaid onto video camera frame to set up a scene for the characters. For example, the storyboard frame may designate the location of media devices, the crew member for each media device, the type and location of props, among other information specific to the associated screenplay. Each screenplay may have two or more versions available (e.g., to shoot vertically or horizontally).

For each scene (e.g., for each storyboard or set of storyboards) the user may direct a person, such as a character or actor, or a crew member controlling one of the other media devices, to a location where that person should stand or perform an action. While the user may direct others based on the user's own preferences, the user may also follow the directions or commands on the storyboard itself. For example, screenshot 1172 shows a storyboard with designated locations for certain people (e.g., Bob and Max) and their associated media devices. Certain media device functionalities may allow for convenient strategies for the media processing system. For example, wide frame may be used so that the user can later cut in editing and have a wide enough frame to do horizontal and vertical video. In another example, GPS may be used to provide exact locations to people. Furthermore, an augmented reality overlay may provide for certain commands to assist the user in both capturing video content and in manipulating the collected video streams that will be used to generate the final content item. For example, the system may present a command or recommendation for the user to stop recording or delay beginning of recording to allow a person to be in place at their designated location. For example, the system (via the software application) may notify the user (e.g., via a display associated with the operator console) when the person has reached their location, or suggestions for how they should move to arrive at their location. Similar commands may be presented for other characteristics of the content item, such as props, lighting, etc.

In addition to assisting the user how to set up the environment for capturing video content, the system may also automatically provide other analysis of the stream, the environment, and other features. For example, analysis may be provided on the display for focus/stability, lighting, and sound. For example, a rating (e.g., red, yellow and green, or a numerical rating) may be presented on the display for the user to see and adjust accordingly. In a first example, a focus or stability analysis and/or rating may be determined and presented to the user. This feature may analyze the video or image captured, and indicate to the user where the focus could improve (and, for example, how to improve it). This determination may be determined using the purpose of the content item or other data collected about the content item or the user's preferences, current or historical. In a second example, a sound analysis and/or rating may be determined and presented to the user. For example, the system may collect data associated with sounds around the operator console, and determine whether the sounds are due to the sound that the user has targeted and wants to capture, or whether the sound is wholly or partially due to unwanted noise. The system may indicate whether there is too much noise beyond a predetermined acceptable level, or a level that it has determined based on the purpose and other data associated with the content item, and an indicator of how the user can fix it. For example, the system may recommend one or multiple options for fixing the noise problem (e.g., the noise is due to a loud truck being present, so it may present a recommendation to wait until the truck goes by). Furthermore, the system may have developed a knowledge about sounds over time, and may make an exception based on the purpose (e.g., a level of noise that would otherwise be too loud is not too loud because the environment is a concert or sporting event). In a third example, a lighting analysis and/or rating may be determined and presented to the user. The system may detect light at certain locations, and may analyze the light in other locations close to the present location. Therefore, the system may recommend to the user that the user move to a different location (or move slightly) to obtain better lighting for capturing video content for this content item.

Figure 12:
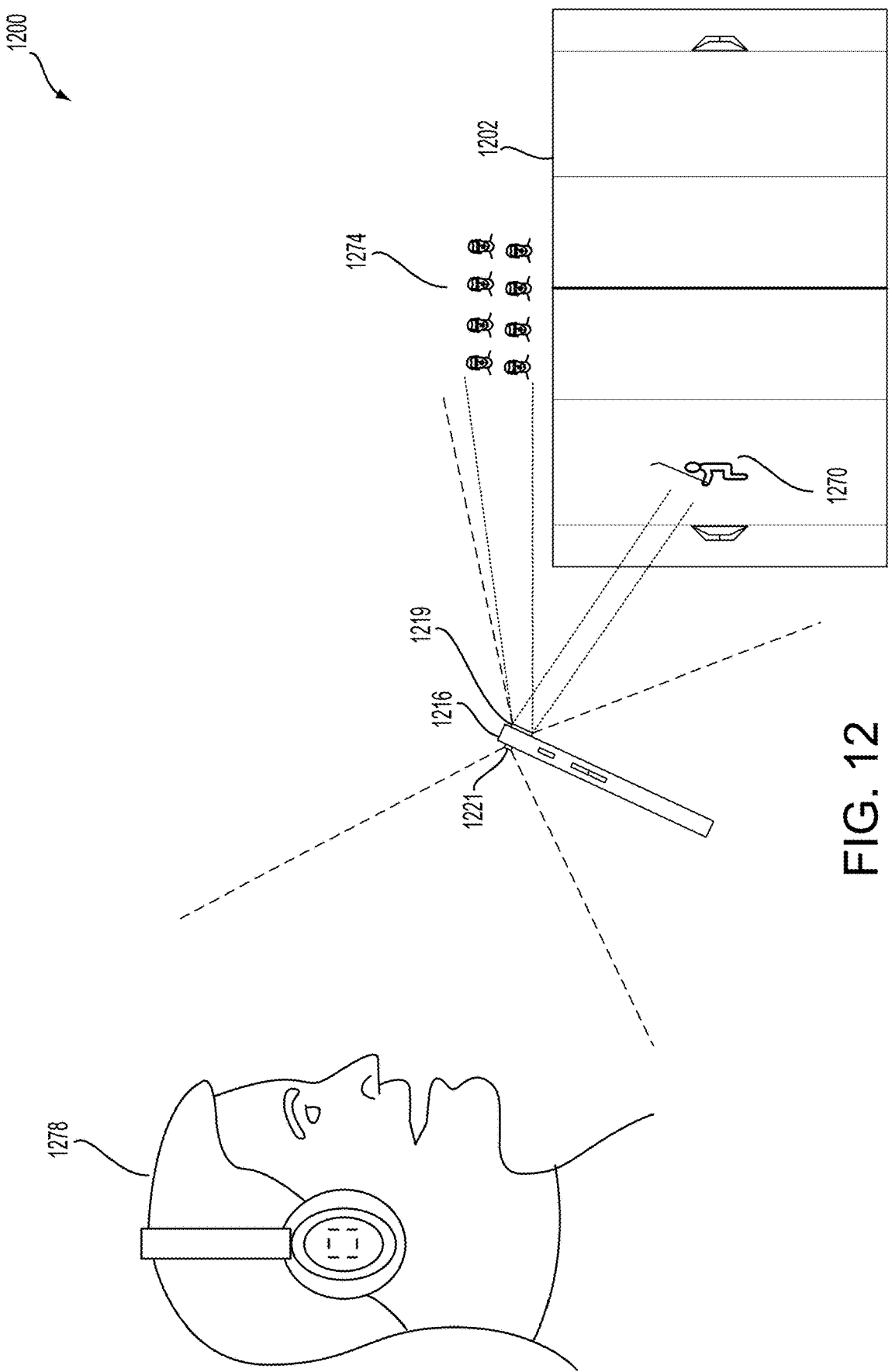
FIG. 12 illustrates a media processing system in an environment including an operator console configured to determine a sweet spot of a user content item, according to embodiments of the present technology.

FIG. 12 illustrates a media processing system in an environment 1200 including an operator console 1216 configured to determine a sweet spot of a user content item, according to embodiments of the present technology. A "sweet spot" of a video content item may be defined as the "best" portion of a scene or video, such as a portion where there is a climax, punch line, or other important event within the context of the entire scene or video. Since a sweet spot may include an important portion of the content item, a user may want to focus on that portion, including generating a content item that only includes the sweet spot or the sweet spot including a certain amount of time surrounding the sweet spot. In one example, a sweet spot of a hockey game event taking place in the venue 1202 may include the game winning goal in the third period of the game, plus some time before the goal to show the play that led up to the goal and some time after the goal to show the celebration of the team who scored the goal and their fans.

A sweet spot may be determined and captured in at least two ways: manually and automatically. A sweet spot may be automatically determined if a user knows when a sweet spot is happening or will happen, and the user can set a beginning time and an end time for the sweet spot to be captured in a content item. A mechanism on a GUI of the operator console 1216 will be shown and described further with respect to FIG. 13. The user may also press a button, either a physical button on the operator console 1216 or a GUI button on a display of the operator console 1216, to initiate the capturing of the sweet spot. For example, the user may press the button when the sweet spot is beginning and again when the sweet spot is ending. Alternatively, the sweet spot may be automatically determined by the media processing system (e.g., by the media studio or by the operator console 1216). For example, the operator console 1216 or the media studio may analyze a video stream or a stored video content to determine a sweet spot in the video. For example, the system could detect "highs" or "lows" in the video based on sound, quick movements, abrupt changes, certain words said by characters (e.g., using voice or audio recognition), among others.

In another example, a different sensor on the operator console 1216 (or a sensor on a different media device) may be used to detect a sweet spot. For example, a rear-facing camera 1221 (e.g., a "selfie" camera) may be used. For example, while the front-facing camera 1219 may be capturing video content of a scene, the rear-facing camera may also be recording video or capturing one or more images of the face of the user 1278. The system may then analyze the video or images of the user to determine if the user reacts to a certain portion of the scene, which the system may then designate as a sweet spot. The system may use facial recognition, biometric sensor/recognition, or other techniques to identify the emotion of the person shooting the scene to find a sweet spot. In order to identify whether such an expression or emotion may be a sweet spot, or to identify whether such an event is abnormal for that particular user, the system may use historical data over time, user inputs, user preferences, the purposes and other characteristics of the user's content items, among others. Since the front-facing camera 1219 may be simultaneously capturing video of the scene, such as a scene involving hockey player 1270, the data captured from each video may be compared to determine when a sweet spot begins and ends. Other data captured from the environment may be used as well, including, for example, the fans 1274 watching the hockey event in the entertainment venue 1202.

After a portion of a video content item has been identified as a sweet spot, that portion may be isolated by cutting around the sweet spot to generate a new video including just the sweet spot. The system may also automatically determine, based for example on the purpose of the content item, analysis of the substance of the content item, or other factors, whether a time period before and/or after the sweet spot should be captured in the new video as well, and how much time. For example, the system may determine that since the purpose of the content item is, for example, a hockey game, the video should include 30 seconds of video before the sweet spot to capture the lead-up to the goal, and 10 second of video after the sweet spot to capture the celebration after the goal. Whether time before and/or after the sweet spot is included, and how much time both before and after, may be specifically determined for each type of purpose or other factors associated with the content item, environment, user, etc. The user may also input predetermined preferences regarding the sweet spot and amounts of time of video captured before and/or after the sweet spot. Also, the user may input these preferences on the fly by interacting with the GUI on the operator console. The amounts of time may also be based on other factors, such as the duration of the video.

Figure 13:
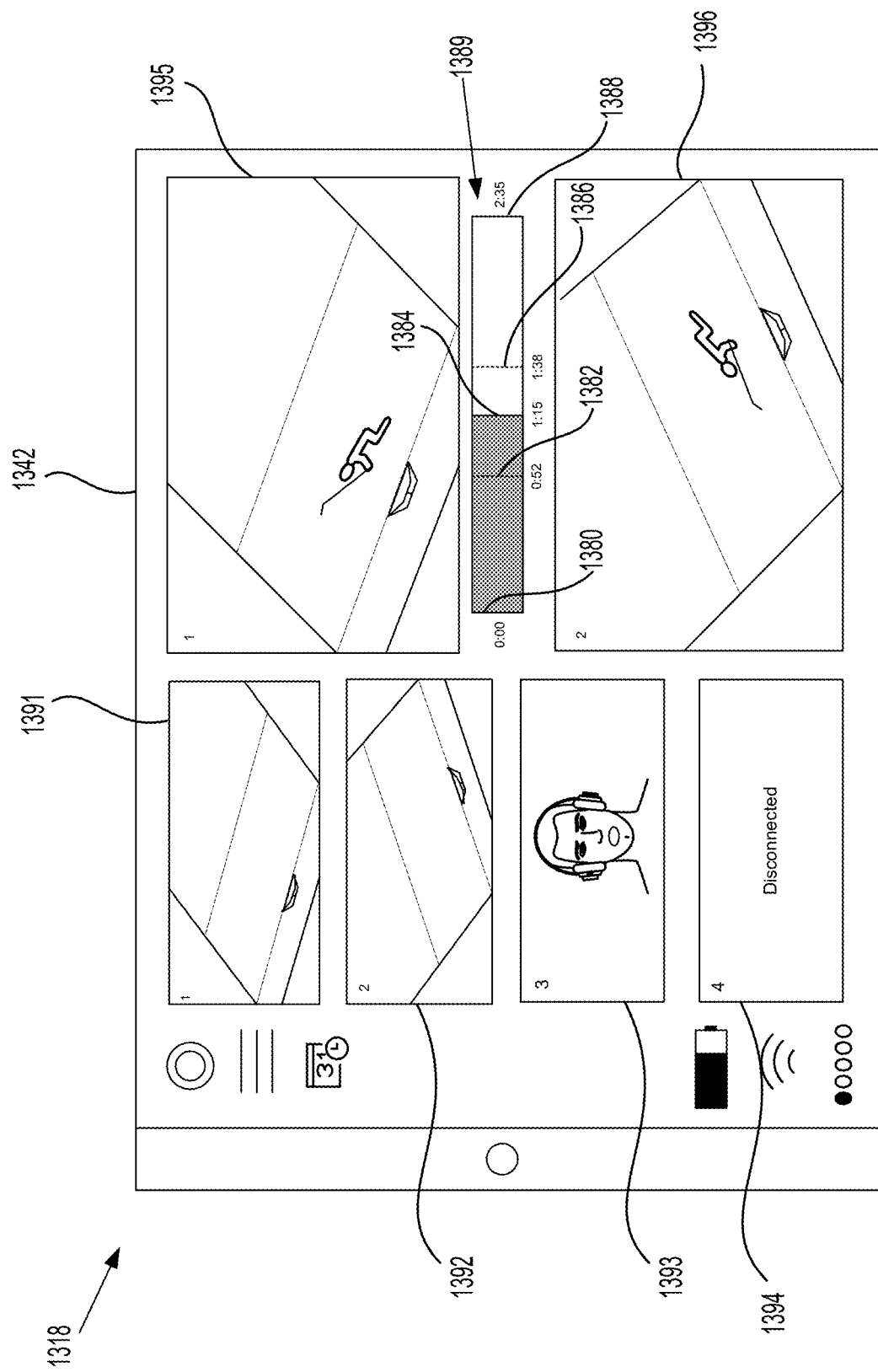
FIG. 13 illustrates a screenshot of a display of an operator console of the media processing system, according to embodiments of the present technology.

FIG. 13 illustrates a screenshot of a display of an operator console of the media processing system, according to embodiments of the present technology. As described with respect to FIG. 12, a different sensor on the operator console 1316 (or a sensor on a different media device) may be used to detect a sweet spot, such as a rear-facing camera. Also, as described further herein with respect to FIG. 10, video content captured by media devices may be transmitted by their respective devices to the operator console 1318 (e.g., via a media studio), and are presented to the user on display 1342 of operator console 1318. Tiles 1391 (also tile 1395 where, for example, the content is being outputted for streaming) and 1392 (also tile 1396 where, for example, the content can be manipulated) show screenshots of video streams from different media devices, where the different media devices are capturing media input items (e.g., video content) of the same environment (e.g., an event at a hockey rink) from different angles. Furthermore, tile 1393 show a screenshot of a video stream or an image captured by the rear-facing camera (e.g., rear-facing camera 1321) of a media device, which has captured the user and the user's reaction, including facial expressions and emotions. Tile 1393 just says "disconnected" because no video stream or other content is being displayed since, for example, no additional media device sensors are capturing content and transmitting that content to the operator console 1318.

As noted with respect to FIG. 12, the user may interact with the operator console in order to input preferences, indicate the beginning or end of a sweet spot, among other actions. An example GUI for this type of interaction is shown in FIG. 13. For example, a dial or time display 1389 may be used by a user to see where a video stream, for example the video stream being broadcasted as shown in tile 1395, is in progress, and/or to interact with and control the video stream. For example, the user may be able to press a finger on the time at which the user believes a sweet spot has begun or finished. The user may manipulate the video to see certain portions of it in order to make that determination. Once the user has found the beginning or end of a sweet spot, or has indicated on a scroll-type mechanism on the GUI a time range of the sweet spot, the user may indicate (e.g., via a physical or GUI tile-type button) that the sweet spot has been found, and to save the sweet spot or generate a content item of the sweet spot, including any before or after time extensions of the video, as described with respect to FIG. 13. For example, dial 1389 may include indications 1380, 1384, and 1388 of the beginning (1380) of a video content item, the end (1388) of a video content item, and the current location (1384), i.e., the point in time of the video that is currently being displayed on a tile, of the video. Furthermore, the dial 1389 may include indicators 1382 and 1386 for the beginning (1382) and end (1386) of a sweet spot, which a user may manipulate, move, etc. The dial 1389 may also include indicators (not shown) for the amount of time before and after the sweet spot that the user wants to include in the final content item, or such indicators may indicate the automatically determined time periods before and after the sweet spot as determined by the system.

After a user content item has been generated, or at least once the multiple media input items have been generated and/or received, the content may be edited to generate the final user content item. The editing may be completed after the content has been generated or received and stored, or it may be completed while the inputs are streaming, such as by manipulation of the display of the operator console by the user, or automatically by the media processing system. For example, the system may automatically cut, zoom, and/or frame a video stream to fit the user's intent as known by data collected about the user, the environment, the purpose, etc. A selected and used screenplay and/or storyboards may assist and guide the editing software to automatically edit the content. For example, the automatic cut, zoom, and/or frame of the content may be done to match the storyboard selected. Other manipulations may be executed, including automatically adding a supplemental text stream overlaid on top of the video content that conveys information about the content, such as the purpose of the video, characters or actors in the video, prop names, etc. In other examples, the software application may, using the storyboards, automatically cut, zoom, and frame the video to match the storyboard for one or both of horizontal and vertical versions of the movie. Text may also include direction to the user or other crew members via the display of the operator console. In another example, the system may automatically select music to match the story purpose and/or scene purpose, or using the screenplay/storyboards used for the content. In another example, the system may automatically generate additional versions of a completed user content item, such as a smaller or larger version, a version with a different perspective (e.g., landscape), among others.

After the content item has been completed, including editing, the content item may be distributed and consumed. The distribution may be automatic after a content item is complete, such as automatic uploading to a server for consumption over the Internet, or for streaming on a website. The trigger may include an action, such as, for example, closing of the camera or turning off the smartphone. Alternatively, distribution may be based on user preference/input or the situation of the content item, including environment, purpose, consumer device, etc. Other variables may also be used, including audio, text, brightness, length, FPS, speed/tempo, vertical/horizontal, etc. Information may be automatically determined and displayed with the content item, such as date and time that it was produced or distributed for the first time.

The vast amounts of data collected during the process of using the media processing system to generate a user content item allows for the system becoming smarter and smarter over time. For example, filmmaker (i.e., user) data may be collected and analyzed to determine future recommendations for that user, or for other users based on the content of the content item (e.g., characters, props, locations, environment, etc.). Filmmaker/user feedback may also be generated and used, such as social media likes, comments, comments of other videos, etc. to automatically determine characteristics of future content items. This data may even be analyzed to automatically determine and present a suggested next video to be created by the user.

In another example, the system may collect filmmaker feedback and use machine learning to determine user preferences, update profile accordingly, and suggest another video to user based on feedback/profile. More specifically, the system may collect data over time related to a user, the user's videos, user's friends/contacts, etc. to generate user profile associated with user's video making abilities/preferences. The system may collect data associated with current video, including location, characters, audio, etc., and use that data to determine a purpose of the video and other characteristics of the video. The user profile may be updated based on data associated with current video. The user profile data may also be compared with stored screenplays and other video information/metadata to determine a suggestion for a possible next video that corresponds to the user's preferences. The suggestion may be presented to the user on the display of the operator console.

Figure 14:
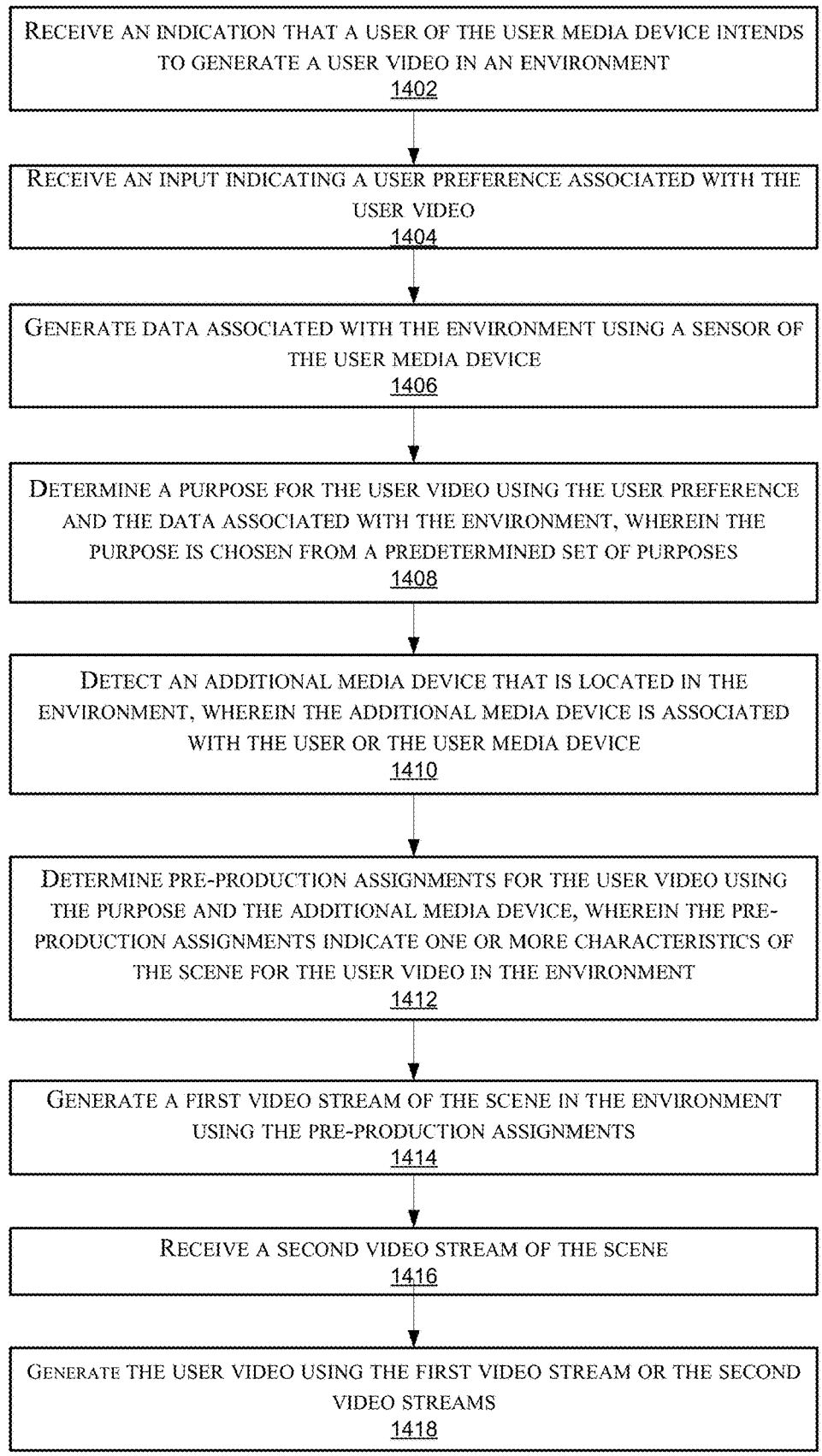
FIG. 14 includes a flow chart illustrating an example process associated with an augmented film crew, according to embodiments of the present technology.

FIG. 14 includes a flow chart illustrating an example process associated with an augmented film crew, according to embodiments of the present technology. Step 1402 includes, for example, receiving, at a display of a user media device, an indication that a user of the user media device intends to generate a user video in an environment. Step 1404 includes, for example, receiving, at the display, an input indicating a user preference associated with the user video. Step 1406 includes, for example, generating, by the user media device, data associated with the environment using a sensor of the user media device. Step 1408 includes, for example, determining, by the user media device, a purpose for the user video using the user preference and the data associated with the environment, wherein the purpose is chosen from a predetermined set of purposes. Step 1410 includes, for example, detecting an additional media device that is located in the environment, wherein the additional media device is associated with the user or the user media device. Step 1412 includes, for example, determining pre-production assignments for the user video using the purpose and the additional media device, wherein the pre-production assignments indicate one or more characteristics of the scene for the user video in the environment. Step 1414 includes, for example, generating, using the user media device, a first video stream of the scene in the environment using the pre-production assignments. Step 1416 includes, for example, receiving, from the additional media device, a second video stream of the scene. Step 1418 includes, for example, generating, by the user media device, the user video using the first video stream or the second video streams. One or more of these steps may be removed, and/or additional steps may be added.

Figure 15:
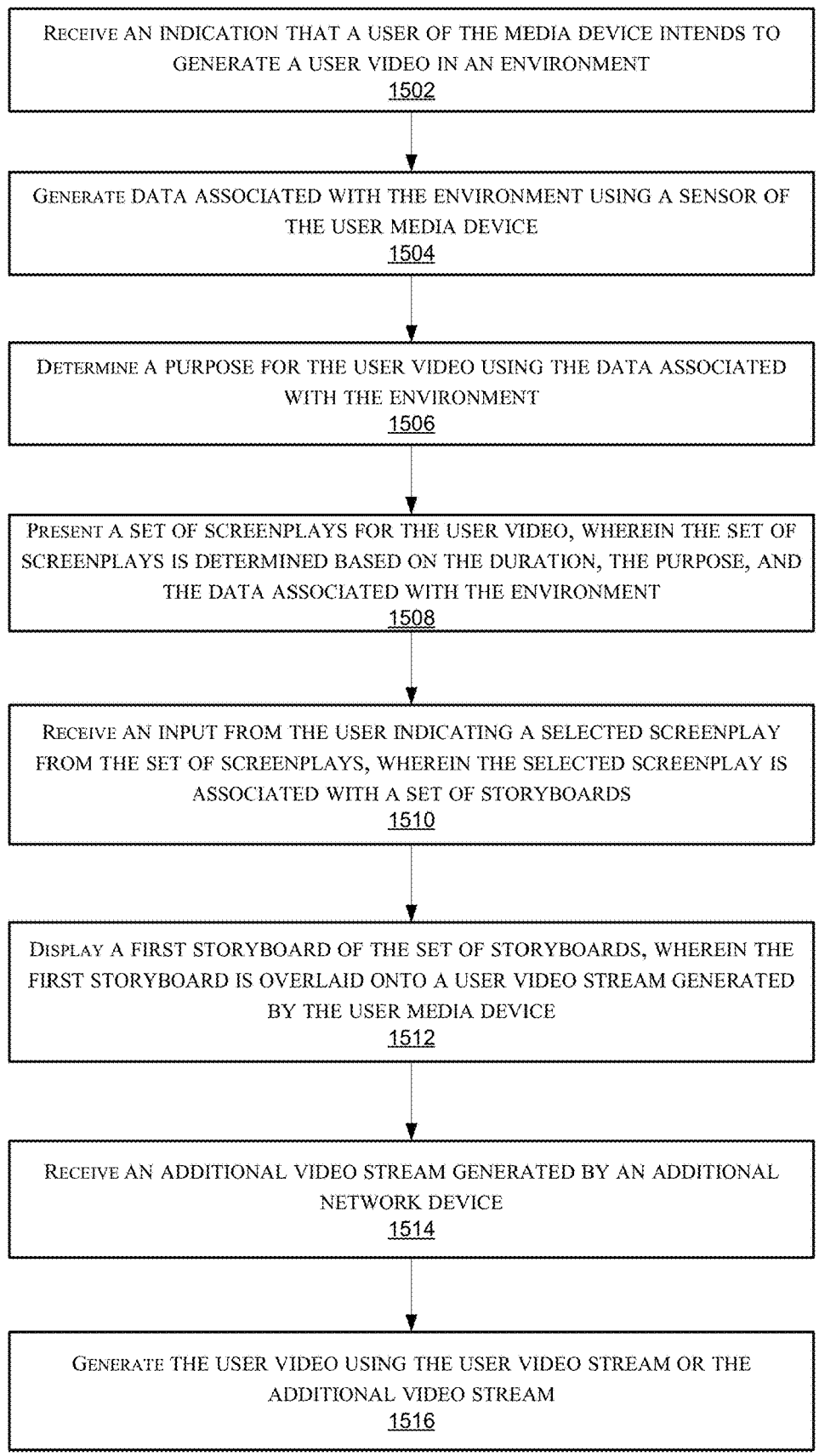
FIG. 15 includes a flow chart illustrating an example process associated with an augmented film crew, according to embodiments of the present technology.

FIG. 15 includes a flow chart illustrating an example process associated with an augmented film crew, according to embodiments of the present technology. Step 1502 includes, for example, receiving, at a display of a user media device, an indication that a user of the media device intends to generate a user video in an environment. Step 1504 includes, for example, generating, by the user media device, data associated with the environment using a sensor of the user media device. Step 1506 includes, for example, determining, by the user media device, a purpose for the user video using the data associated with the environment. Step 1508 includes, for example, presenting, at the display, a set of screenplays for the user video, wherein the set of screenplays is determined based on the duration, the purpose, and the data associated with the environment. Step 1510 includes, for example, receiving, at the display, an input from the user indicating a selected screenplay from the set of screenplays, wherein the selected screenplay is associated with a set of storyboards. Step 1512 includes, for example, displaying, at the user media device, a first storyboard of the set of storyboards, wherein the first storyboard is overlaid onto a user video stream generated by the user media device. Step 1514 includes, for example, receiving, at the user media device, an additional video stream generated by an additional network device. Step 1516 includes, for example, generating, by the user media device, the user video using the user video stream or the additional video stream.

Figure 16:
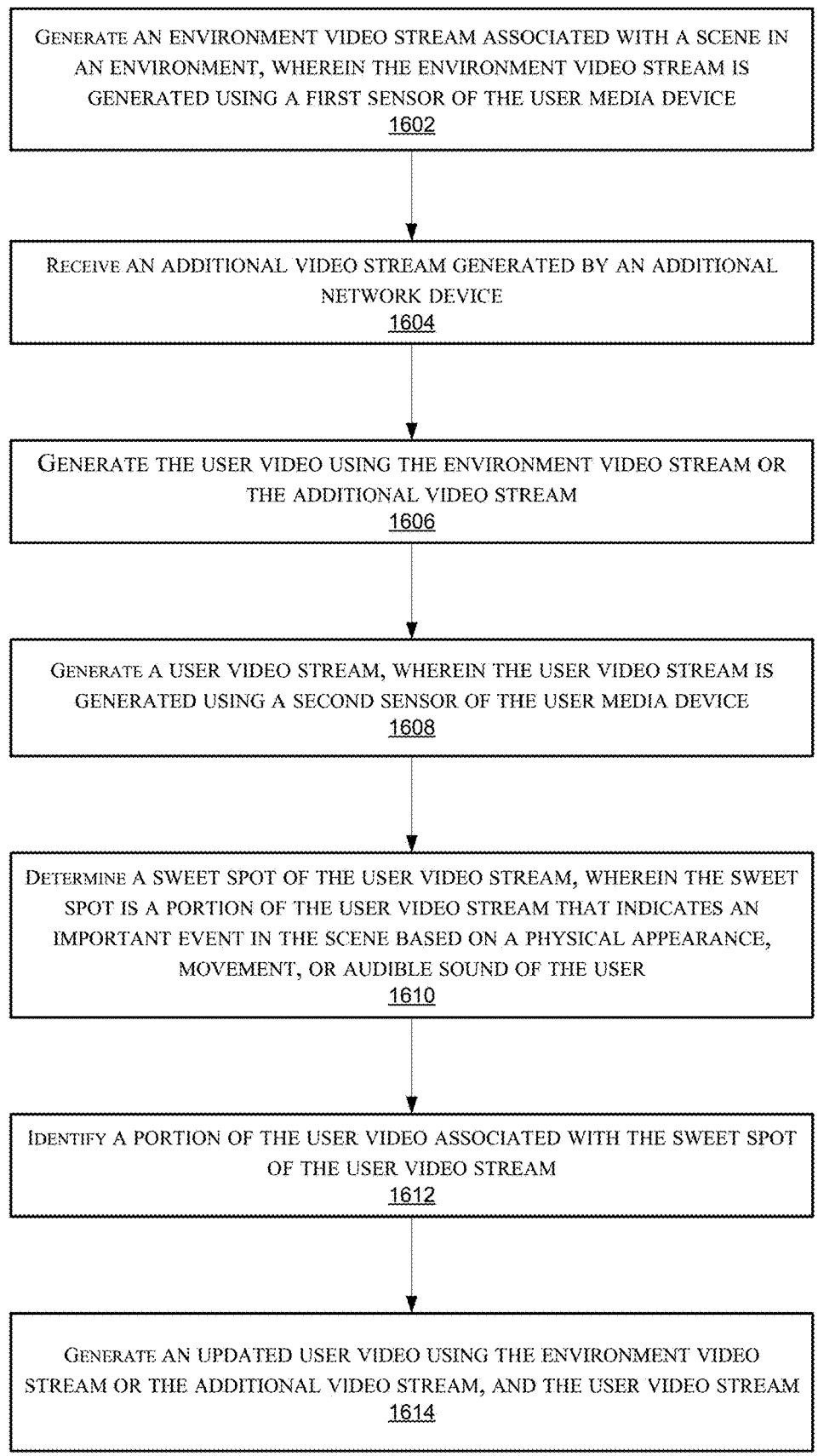
FIG. 16 includes a flow chart illustrating an example process associated with an augmented film crew, according to embodiments of the present technology.

FIG. 16 includes a flow chart illustrating an example process associated with an augmented film crew, according to embodiments of the present technology. Step 1602 includes, for example, generating, by a user media device, an environment video stream associated with a scene in an environment, wherein the environment video stream is generated using a first sensor of the user media device. Step 1604 includes, for example, receiving, at the user media device, an additional video stream generated by an additional network device. Step 1606 includes, for example, generating the user video using the environment video stream or the additional video stream. Step 1608 includes, for example, generating a user video stream, wherein the user video stream is generated using a second sensor of the user media device. Step 1610 includes, for example, determining a sweet spot of the user video stream, wherein the sweet spot is a portion of the user video stream that indicates an important event in the scene based on a physical appearance, movement, or audible sound of the user. Step 1612 includes, for example, identifying a portion of the user video associated with the sweet spot of the user video stream. Step 1614 includes, for example, generating an updated user video using the environment video stream or the additional video stream, and the user video stream.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system comprising:
media studio appliance comprising:
one or more communication interfaces configured to communicatively couple with an operator console, a camera, and one or more data collectors, the camera and the data collectors being physically disposed in an environment; and
one or more processors configured to:
receive, from the operator console via the one or more communication interfaces, a first user indication to create a user video of live action in the environment;
collect sensor data associated with the environment from the one or more data collectors automatically responsive to the first user indication and without additional user input;
output, to the operator console, a set of screenplays for the user video based on a purpose for the user video automatically determined in response to the collecting and in accordance with the data associated with the environment, each screenplay of the set of screenplays identifying at least a list of scenes with characters to be captured from the live action in the environment as part of the user video to fulfill the automatically determined purpose for the video;
receive, from the operator console, a second user indication of a selected screenplay from the set of screenplays; and
direct the operator console, responsive to receiving the second user indication, concurrently to display a user video stream of the live action as it is being received from the camera and a storyboard of a set of storyboards stored in association with the selected screenplay.

2. The system of claim 1, wherein the one or more processors are configured to direct the operator console concurrently to display the user video stream and the storyboard, such that the storyboard is overlaid on the user video stream.

3. The system of claim 1, wherein the one or more processors are configured to direct the operator console concurrently to display the user video stream and the storyboard, such that the storyboard is displayed as a collection of storyboard images, each to visualize a corresponding frame of the storyboard.

4. The system of claim 1, wherein the one or more processors are further configured to determine the purpose for the user video automatically in response to the collecting and in accordance with the data associated with the environment.

5. The system of claim 1, wherein:
the one or more processors are configured further to identify a duration of the user video using the purpose and the data associated with the environment; and
the one or more processors are configured to output the set of screenplays based further on the duration.

6. The system of claim 1, wherein the one or more processors are configured further to:
determine one or more recommended locations associated with the environment;
assign one or more scenes of the screenplay to the one or more recommended locations; and
direct, via the operator console, locating the camera in a particular one of the recommended locations associated with a particular one of the scenes for collection of a portion of the user video stream associated with the scene.

7. The system of claim 1, further comprising:
the operator console, configured to communicatively couple with the media studio appliance via at least one of the one or more communication interfaces, and comprising:
a display to concurrently display the user video stream and the storyboard to the user responsive to the directing by the media studio appliance.

8. The system of claim 1, wherein the media studio appliance further comprises:
a database of stored screenplays,
wherein the one or more processors are configured to output the set of screenplays by retrieving the set of screenplays from the database of stored screenplays.

9. The system of claim 1, wherein:
the one or more processors are configured further to receive an additional video stream generated by a second camera communicatively coupled with the media studio appliance via at least one of the one or more communication interfaces; and
the one or more processors are configured to direct the operator console, responsive to receiving the second user indication, further to concurrently display the additional video stream with the user video stream and the storyboard.

10. The system of claim 1, wherein the one or more processors are configured further to:
generate the user video by automatically editing the user video stream in accordance with the storyboard.

11. The system of claim 1, wherein the media studio appliance further comprises:
a non-transient, processor-readable memory having instructions stored thereon, which, when executed, configure the one or more processors to receive the first user indication, collect the sensor data, output the set of screenplays, receive the second user indication, and direct the operator console concurrently to display the user video stream and the as storyboard.

12. The system of claim 1, wherein the media studio appliance is integrated with a portable network router appliance configured to general a wireless local area network, at least one of the one or more communication interfaces operating via the wireless local area network.

13. A method comprising:
receiving a first user indication to create a user video of live action in an environment;
collecting sensor data associated with the environment automatically responsive to the first user indication and without additional user input;
outputting a set of screenplays for the user video based on a purpose for the user video automatically determined in response to the collecting and in accordance with the data associated with the environment, each screenplay of the set of screenplays identifying at least a list of scenes with characters to be captured from the live action in the environment as part of the user video to fulfill the automatically determined purpose for the video;
receiving a second user indication of a selected screenplay from the set of screenplays; and
directing, responsive to receiving the second user indication, concurrent display of a user video stream of the live action as it is being received from a camera and a storyboard of a set of storyboards stored in association with the selected screenplay.

14. The method of claim 13, wherein the directing is such that the storyboard is overlaid on the user video stream.

15. The method of claim 13, wherein the directing is such that the storyboard is displayed as a collection of storyboard images, each to visualize a corresponding frame of the storyboard.

16. The method of claim 13, further comprising:
determining the purpose for the user video automatically in response to the collecting and in accordance with the data associated with the environment.

17. The method of claim 13, further comprising:
identifying a duration of the user video using the purpose and the data associated with the environment,
wherein the outputting the set of screenplays is based further on the duration.

18. The method of claim 13, further comprising:
determining one or more recommended locations associated with the environment;
assigning one or more scenes of the screenplay to the one or more recommended locations; and
directing, via the operator console, locating the camera in a particular one of the recommended locations associated with a particular one of the scenes for collection of a portion of the user video stream associated with the scene.

19. The method of claim 13, further comprising:
receiving an additional video stream generated by a second camera concurrent with receiving the user video stream,
wherein the directing is further to concurrently display the additional video stream with the user video stream and the storyboard.

20. The method of claim 13, further comprising:
generating the user video by automatically editing the user video stream in accordance with the storyboard.

* * * * *